US012809069B2

(12) United States Patent
Yashima et al.

(10) Patent No.: US 12,809,069 B2
(45) Date of Patent: Nov. 24, 2026

(54) DIFFRACTIVE OPTICAL ELEMENT, OPTICAL APPARATUS, DISPLAY APPARATUS, AND IMAGING APPARATUS

(71) Applicant: CANON KABUSHIKI KAISHA, Tokyo (JP)

(72) Inventors: Kumiko Yashima, Tokyo (JP); Hideo Genda, Tokyo (JP); Kouichi Yonetani, Kanagawa (JP); Hiroyuki Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 18/611,287

(22) Filed: Mar. 20, 2024

(65) Prior Publication Data

US 2024/0319418 A1 Sep. 26, 2024

(30) Foreign Application Priority Data

Mar. 23, 2023 (JP) ................................ 2023-046875
Sep. 1, 2023 (JP) ................................ 2023-142311

(51) Int. Cl.
*G02B 5/18* (2006.01)

(52) U.S. Cl.
CPC ......... *G02B 5/1823* (2013.01); *G02B 5/1842* (2013.01); *G02B 5/1895* (2013.01)

(58) Field of Classification Search
CPC ... G02B 5/1823; G02B 5/1842; G02B 5/1895
See application file for complete search history.

(56) References Cited

U.S. PATENT DOCUMENTS

| | | | | |
|---|---|---|---|---|
| 8,395,084 | B2 * | 3/2013 | Tanaka ............... | H10D 86/0214 219/121.73 |
| 2009/0311630 | A1 | 12/2009 | Noro | |
| 2010/0246008 | A1 | 9/2010 | Murata | |
| 2012/0200925 | A1 | 8/2012 | Iwasa | |

(Continued)

FOREIGN PATENT DOCUMENTS

| | | |
|---|---|---|
| JP | H0772310 A | 3/1995 |
| JP | 2004013081 A | 1/2004 |

(Continued)

*Primary Examiner* — Lucy P Chien

(74) *Attorney, Agent, or Firm* — Canon U.S.A., Inc. IP Division

(57) ABSTRACT

A diffractive optical element includes: a substrate having a surface on which a diffraction grating is provided; and a resin layer provided on the surface of the substrate so as to cover the diffraction grating, wherein, in plan view as viewed along an optical axis direction, the diffraction grating includes: a first diffraction grating having a circular shape; and a second diffraction grating having an arc shape, the second diffraction grating being arranged on an outer side of the first diffraction grating, wherein the diffractive optical element includes an optical effective region and a non-optical effective region surrounding the optical effective region, wherein the second diffraction grating has an arc end positioned in the non-optical effective region, and wherein a thickness of the resin layer provided in the non-optical effective region is larger than a thickness of the resin layer provided in the optical effective region.

17 Claims, 14 Drawing Sheets

(56) References Cited

U.S. PATENT DOCUMENTS

| | | | | |
|---|---|---|---|---|
| 2012/0223350 | A1* | 9/2012 | Tanaka | B32B 17/10 257/E33.073 |
| 2013/0057956 | A1 | 3/2013 | Iwasa | |
| 2013/0077170 | A1 | 3/2013 | Ukuda | |
| 2014/0347734 | A1 | 11/2014 | Kamikihara | |
| 2020/0103567 | A1 | 4/2020 | Tsuruki | |
| 2021/0088440 | A1* | 3/2021 | Sakamoto | G01N 21/552 |

FOREIGN PATENT DOCUMENTS

| | | | | |
|---|---|---|---|---|
| JP | 2004042493 | A | 2/2004 | |
| JP | 2005305958 | A | 11/2005 | |
| JP | 2006221062 | A | 8/2006 | |
| JP | 2007293953 | A | 11/2007 | |
| JP | 2010139532 | A | 6/2010 | |
| JP | 2010211115 | A | 9/2010 | |
| JP | 2010532496 | A | 10/2010 | |
| JP | 2012128319 | A | 7/2012 | |
| JP | 2012252307 | A | 12/2012 | |
| JP | 2016206688 | A | 12/2016 | |
| JP | 2017211466 | A | 11/2017 | |
| JP | 2019086707 | A | 6/2019 | |
| JP | 2019164267 | A | 9/2019 | |
| JP | 2019207326 | A | 12/2019 | |
| JP | 2021009199 | A | 1/2021 | |
| WO | WO-2012023274 | A1 * | 2/2012 | G02B 27/4277 |
| WO | 2012176388 | A1 | 12/2012 | |

* cited by examiner

DIFFRACTIVE OPTICAL ELEMENT, OPTICAL APPARATUS, DISPLAY APPARATUS, AND IMAGING APPARATUS

BACKGROUND

Field of the Disclosure

The present disclosure relates to a diffractive optical element, an optical apparatus, a display apparatus, and an imaging apparatus.

Description of the Related Art

Hitherto, there has been known a method of reducing chromatic aberration of a lens system by providing, in a part of an optical system, a diffractive optical element having a diffractive action. In addition to correction of the chromatic aberration, the diffractive optical element has been known to exhibit an effect as an aspherical surface by appropriately changing a grating pitch of its periodical structure.

Further, it is known that, in the diffractive optical element used as the lens of the optical system, when two diffraction gratings are arranged in close contact with each other and a material forming each diffraction grating and a grating height thereof are appropriately set, a high diffraction efficiency can be obtained in a wide wavelength band.

In International Publication No. WO2012/176388, there is described a diffractive optical element including: a body being formed of a first optical material and having a diffraction grating on a surface thereof, and an optical adjustment layer being formed of a second optical material and provided on the body so as to cover the diffraction grating. In the diffractive optical element described in International Publication No. WO2012/176388, the optical adjustment layer formed of the second optical material including a resin has a uniform thickness in a normal direction from an envelope, which is a curved surface passing through an edge of the diffraction grating. In this manner, in the diffractive optical element described in International Publication No. WO2012/176388, cracks are prevented from being caused by stress acting on the optical adjustment layer due to curing shrinkage of the second optical material during manufacture or the like.

In International Publication No. WO2012/176388, there is disclosed a technology of forming the optical adjustment layer which is a resin layer on the body to have a constant thickness so that cracks are prevented from being caused due to local concentration of stress on the optical adjustment layer at the time of curing shrinkage. However, when the body has an arc shape as that obtained by cutting a part of a circular lens shape, in plan view as viewed in an optical axis direction, the diffraction grating on the body has a circular shape on the inner side, but has an arc shape on the outer side. The diffraction grating having an arc shape has a different shrinkage behavior at the time of curing of the resin formed on the diffraction grating, as compared to that in the case of only the diffraction grating having a circular shape. Accordingly, in the case of the diffractive optical element in which the diffraction grating having a circular shape and the diffraction grating having an arc shape are provided on the body, even when the thickness of the resin layer on the body is kept constant as in the technology disclosed in International Publication No. WO2012/176388, reduction in the diffraction efficiency is caused due to a density difference of the resin layer, and thus an optical characteristic is liable to deteriorate.

SUMMARY OF THE DISCLOSURE

The present disclosure has an object to provide a diffractive optical element with which deterioration of an optical characteristic can be reduced or prevented when, in plan view, a diffraction grating having a circular shape and a diffraction grating having an arc shape are provided.

According to one aspect of the present disclosure, there is provided a diffractive optical element including: a substrate having a surface on which a diffraction grating is provided; and a resin layer provided on the surface of the substrate so as to cover the diffraction grating, wherein, in plan view as viewed along an optical axis direction, the diffraction grating includes: a first diffraction grating having a circular shape; and a second diffraction grating having an arc shape, the second diffraction grating being arranged on an outer side of the first diffraction grating, wherein the diffractive optical element includes an optical effective region and a non-optical effective region surrounding the optical effective region, wherein the second diffraction grating has an arc end positioned in the non-optical effective region, and wherein a thickness of the resin layer provided in the non-optical effective region is larger than a thickness of the resin layer provided in the optical effective region.

According to another aspect of the present disclosure, there is provided a diffractive optical element including: a substrate having a surface on which a diffraction grating is provided; and a resin layer provided on the surface of the substrate so as to cover the diffraction grating, wherein, in plan view as viewed along an optical axis direction, the diffraction grating includes: a first diffraction grating having a circular shape; and a second diffraction grating having an arc shape, the second diffraction grating being arranged on an outer side of the first diffraction grating, wherein the diffractive optical element includes a first region in which the diffraction grating is provided and a second region in which the diffraction grating is not provided, the second region being arranged on an outer side of the first region, and wherein the diffractive optical element includes a region in which a first gradient in which a thickness of the resin layer increases toward an outer side from a center of a circle of the diffraction grating is 0.4 or more, in a third region including a boundary between the first region and the second region on a side on which the diffraction grating is discontinuous.

Further features of the present disclosure will become apparent from the following description of exemplary embodiments with reference to the attached drawings.

DESCRIPTION OF THE EMBODIMENTS

First Embodiment

A diffractive optical element according to one embodiment of the present disclosure and a method of manufacturing the diffractive optical element are described with reference to FIG. 1 to FIG. 4E.

First, a configuration of the diffractive optical element according to the first embodiment is described with reference to FIG. 1 to FIG. 2B.

Figure 1:
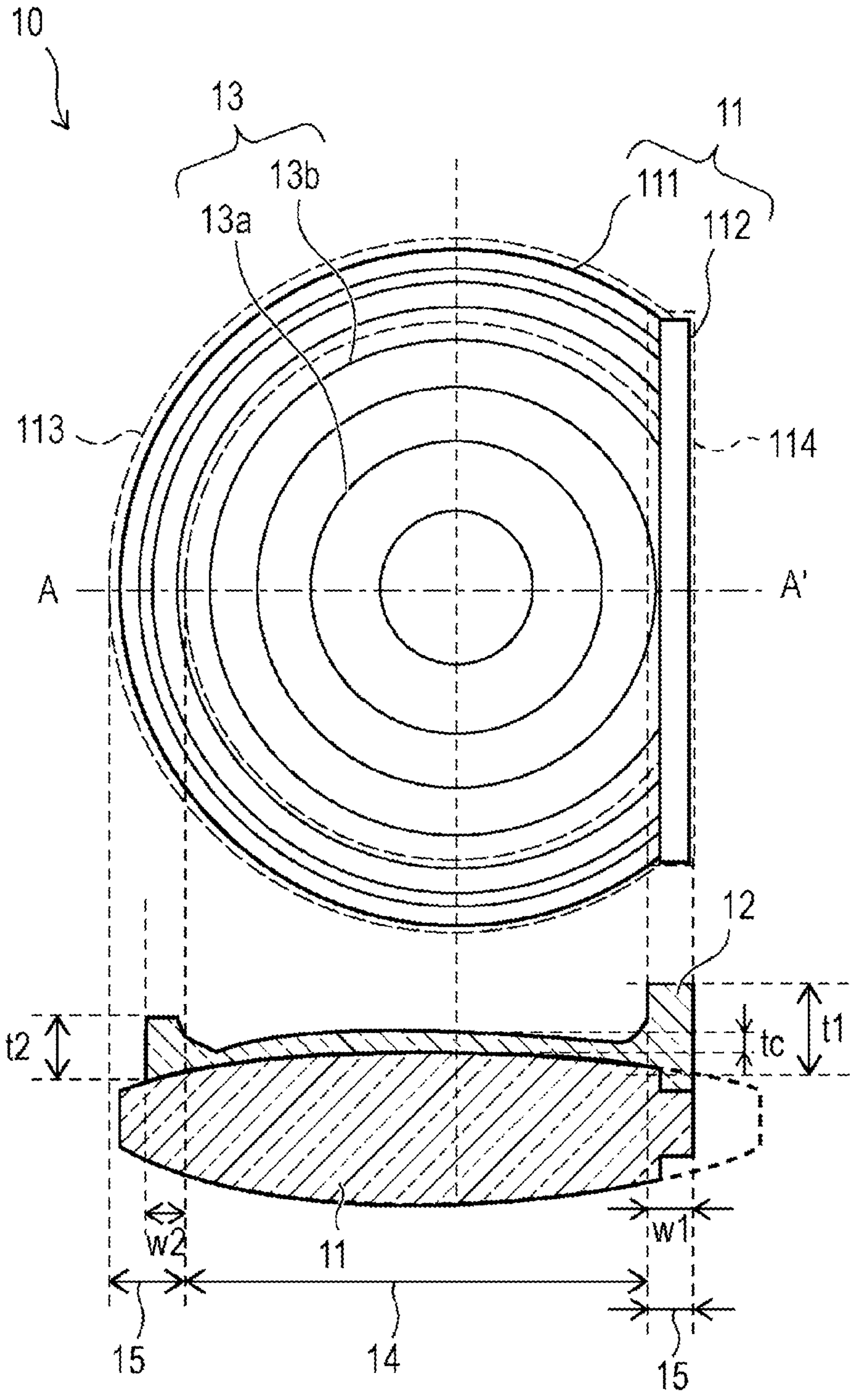
FIG. 1 is a schematic view for illustrating a diffractive optical element according to a first embodiment of the present disclosure.
Figure 2A:
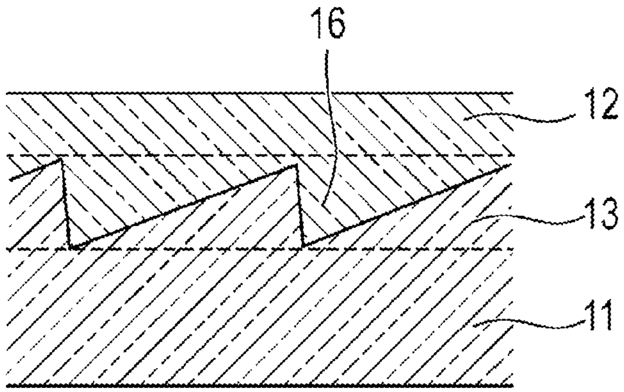
FIG. 2A and FIG. 2B are schematic sectional views for illustrating a diffraction grating in the diffractive optical element according to the first embodiment of the present disclosure.

FIG. 1 is a schematic view for illustrating a diffractive optical element 10 according to the first embodiment. The upper part of FIG. 1 is a plan view for illustrating the diffractive optical element 10 according to the first embodiment in plan view as viewed in an optical axis direction. The lower part of FIG. 1 is a sectional view taken along the line A-A' of the plan view in the upper part of FIG. 1. FIG. 2A and FIG. 2B are sectional views for illustrating, in an enlarged manner, a diffraction grating 13 in the diffractive optical element 10 according to the first embodiment.

The diffractive optical element 10 according to the first embodiment includes, as illustrated in FIG. 1, as two optical elements, a substrate 11 serving as a body and a resin layer 12. The diffractive optical element 10 according to the first embodiment is used in an optical apparatus, such as a digital camera, a video camera, binoculars, or a head mounted display. The substrate 11 has the diffraction grating 13 provided on one surface thereof. The resin layer 12 is provided on the surface of the substrate 11 on which the diffraction grating 13 is provided so as to cover the diffraction grating 13.

The substrate 11 is, for example, a convex-lens-shaped substrate, and may be a resin substrate formed by injection molding, or a glass substrate. The shape of the substrate 11 may be a concave lens shape other than the convex lens shape, or may be a convex spherical surface shape, a concave spherical surface shape, an aspherical surface shape, a planar shape, or other shapes. Further, a material forming the substrate 11 is not particularly limited as long as the material is a transparent material having transmittance with respect to light such as visible light which is a target of the diffractive optical element 10.

The term "transparent" means that, for example, the transmittance of light having a wavelength range of from 420 nm or more to 700 nm or less is 10% or more.

In plan view as viewed in the optical axis direction of the diffractive optical element 10, the substrate 11 has a planar shape including a segmental circular shape and a rectangular shape. The segmental circular shape is a shape enclosed between an arc and a chord connecting both ends of this arc to each other. The rectangular shape is coupled to this segmental circular shape. The segmental circular shape of the substrate 11 is a shape enclosed between a major arc having a central angle of more than 180° and a chord connecting both ends of this major arc to each other. The center of the circle of the segmental circular shape is an optical center of the diffractive optical element 10. The rectangular shape coupled to the segmental circular shape of the substrate 11 has the chord of the segmental circular shape as its longitudinal side. The substrate 11 includes a first portion 111 having a planer shape of the segmental circular shape, and a second portion 112 having a planer shape of the rectangular shape. The first portion 111 has a shape obtained by cutting a shape such as the above-mentioned lens shape along the optical axis direction at a position of the chord. The second portion 112 has a plate-like shape projecting from a middle of a cut portion at the position of the chord of the first portion 111. The shape including the planar shape of the substrate 11 is not limited to the shape illustrated in FIG. 1, and can be an appropriate shape depending on the usage of the diffractive optical element 10 or the like.

The diffractive optical element 10 including the substrate 11 includes an optical effective region 14 and a non-optical effective region 15. The optical effective region 14 is a region within an optical effective diameter. The non-optical effective region 15 surrounds the optical effective region 14 in a region outside of the optical effective diameter. The optical effective region 14 is a region through which light being the target of the diffractive optical element 10 passes, and the non-optical effective region 15 is a region outside of the optical effective region 14. The non-optical effective region 15 includes an arc portion 113 and a chord portion 114. The arc portion 113 is an end portion of the first portion 111 on the arc side, and the chord portion 114 is formed of the second portion 112 and an end portion of the first portion 111 on the chord side.

The diffraction grating 13 is formed concentrically on one surface of the first portion 111 having a planar shape of the segmental circular shape of the substrate 11, with the center of the circle of the segmental circular shape through which the optical axis of the diffractive optical element 10 passes serving as a center. For example, the diffraction grating 13 is formed so that a slope surface and a wall surface are successively repeated toward an outer periphery from an element center through which the optical axis passes (see FIG. 2A and FIG. 2B to be referred to later).

The first portion 111 of the substrate 11 has a planar shape of the segmental circular shape, and hence the diffraction grating 13 includes a diffraction grating 13*a* having a circular shape on the inner side of the substrate 11, and a diffraction grating 13*b* having an arc shape on the outer side of the substrate 11. The diffraction grating 13*b* on the outer side of the substrate 11 is disconnected at an end of the chord portion 114 of the first portion 111 of the substrate 11, and hence has an arc shape. An arc end of the diffraction grating 13*b* having the arc shape is positioned at the chord portion 114 which is the non-optical effective region 15.

The resin layer 12 is provided on one surface of the first portion 111 and one surface of the second portion 112 of the substrate 11 so as to cover the diffraction grating 13. The resin forming the resin layer 12 is not particularly limited as long as the resin is a transparent resin having transmittance with respect to light such as visible light which is the target of the diffractive optical element 10, but it is preferred that the resin be a photocurable resin or a thermosetting resin from the viewpoint of easiness in manufacture.

As illustrated in FIG. 2A, the resin layer 12 is formed on the substrate 11 in close contact with the substrate 11 so as to fill a recessed portion between protruding portions of the diffraction grating 13. In this manner, the resin layer 12 includes a diffraction grating 16 formed adjacent to the diffraction grating 13 of the substrate 11 so as to cover the diffraction grating 13.

Figure 2B:
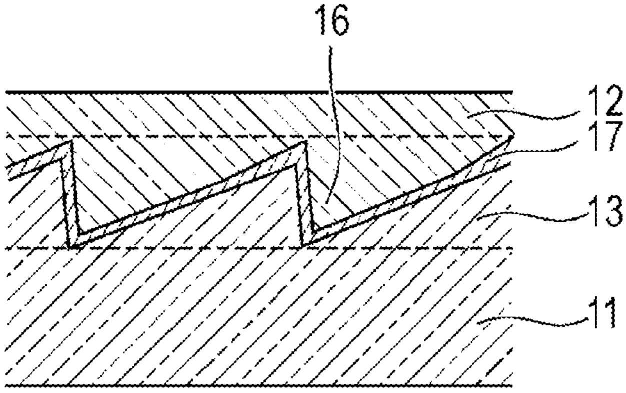

As illustrated in FIG. 2B, a transparent inorganic film 17 may be provided between the substrate 11 and the resin layer 12. That is, the transparent inorganic film 17 may be provided on the diffraction grating 13 of the substrate 11, and the resin layer 12 may be provided on the substrate 11 through intermediation of the transparent inorganic film 17. In this case, the transparent inorganic film 17 is a thin film made of a transparent inorganic material having transmittance with respect to light such as visible light which is the target of the diffractive optical element 10. Examples of the inorganic material include an aluminum oxide ($Al_2O_3$), a silicon oxide ($SiO_2$, SiO), a titanium oxide ($TiO_x$), a tantalum oxide ($TaO_x$), and a niobium oxide ($NbO_x$). The transparent inorganic film 17 can be provided along a grating surface of the diffraction grating 13 so as to cover the grating surface. The transparent inorganic film 17 can be provided by using various film forming methods such as vacuum deposition and sputtering.

With the transparent inorganic film 17 being provided, when the substrate 11 is made of a resin, penetration or dissolution of the resin material between the substrate 11 and the resin layer 12 can be reduced or prevented, and thus the deterioration of the diffraction efficiency can be reduced or prevented. Moreover, the transparent inorganic film 17 may be provided so that the thickness of the transparent inorganic film 17 at a grating edge of the diffraction grating 13 is larger than the thickness of the transparent inorganic film in the grating surface other than the grating edge of the diffraction grating 13. In this manner, while the initial influence of the transparent inorganic film on the optical performance is suppressed to be small, the deterioration of the diffraction efficiency due to penetration or dissolution of the resin material at the grating edge of the diffraction grating 13 can be reduced or prevented.

The resin layer 12 is provided so that, in the optical effective region 14 which is a region within the optical effective diameter, the resin layer 12 has substantially the same thickness “tc” with respect to an envelope which is a surface passing through an edge of the diffraction grating 13. Meanwhile, the resin layer 12 is provided so that, in the non-optical effective region 15 which is a region outside of the optical effective diameter, the resin layer 12 has a thickness larger than the thickness “tc” in the optical effective region 14.

Specifically, in the chord portion 114 in the non-optical effective region 15, the resin layer 12 is provided to have a thickness t1 larger than the thickness “tc”. Further, in the arc portion 113 in the non-optical effective region 15, the resin layer 12 is provided to have a thickness t2 larger than the thickness “tc”.

The thickness “tc” can be regarded as an average thickness of the resin layer 12 provided in the optical effective region 14 from the envelope of the diffraction grating 13. Further, the thickness t1 can be regarded as an average thickness of the resin layer 12 provided in the chord portion 114 in the non-optical effective region 15. Further, the thickness t2 can be regarded as an average thickness of the resin layer 12 provided in the arc portion 113 in the non-optical effective region 15. The thickness of the resin layer 12 can be measured through use of a shape measuring machine or the like. The thickness of the resin layer 12 can be obtained by taking a difference between a measured value of the surface shape of the diffractive optical element 10 obtained by the shape measuring machine or the like and the shape of the substrate 11.

The thicknesses t1 and t2 of the resin layer 12 provided in the non-optical effective region 15 are larger than the thickness “tc” of the resin layer 12 provided in the optical effective region 14 as described above so that, in consideration of shrinkage at the time of curing of the resin forming the resin layer 12, a density difference of the resin caused by the curing is suppressed to be small.

Figure 3A:
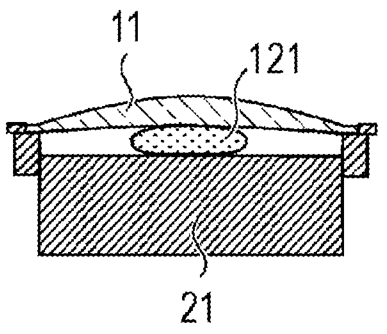
FIG. 3A, FIG. 3B, and FIG. 3C are schematic sectional views for illustrating steps of a method of manufacturing the diffractive optical element according to the first embodiment of the present disclosure.
Figure 3B:
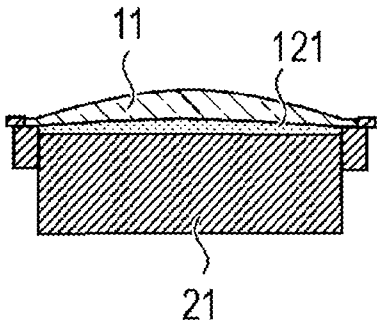
Figure 3C:
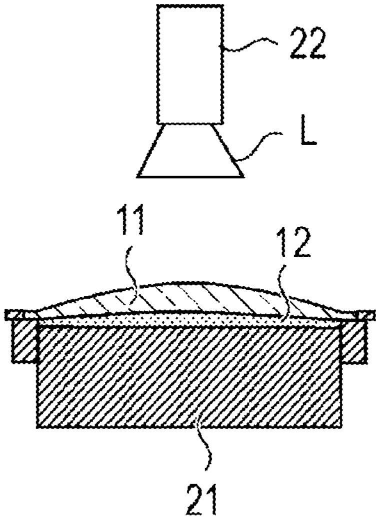

The phenomenon in which the density difference of the resin is caused by curing is described with reference to FIG. 3A to FIG. 4E, together with a method of manufacturing the diffractive optical element 10 according to the first embodiment. FIG. 3A to FIG. 3C are schematic sectional views for illustrating steps of the method of manufacturing the diffractive optical element 10 according to the first embodiment. FIG. 4A to FIG. 4E are schematic views for illustrating shrinkage of the resin at the time of curing.

When the diffractive optical element 10 according to the first embodiment is manufactured, first, as illustrated in FIG. 3A, a liquid resin 121 is ejected to a mold 21 for forming the resin layer 12, and the resin 121 on the mold 21 and the surface of the substrate 11 on which the diffraction grating 13 is provided are brought into contact with each other. FIG. 3A to FIG. 3C show the substrate 11 having a sectional shape different from that of FIG. 1. Next, as illustrated in FIG. 3B, a space between the mold 21 and the substrate 11 is filled with the resin 121 while controlling the distance therebetween. Next, as illustrated in FIG. 3C, the resin 121 after the filling is cured so as to form the resin layer 12 formed of the cured resin 121. It is preferred that a photocurable resin or a thermosetting resin be used as the resin 121 at this time. When the photocurable resin is used as the resin 121, the resin 121 between the mold 21 and the substrate 11 is irradiated with light L such as ultraviolet light for curing the resin 121 by a light irradiating machine 22. The photocurable resin is particularly preferred from the points of having fast curing speed and being excellent in terms of cost. Examples of the photocurable resin include an acrylic-based resin, a methacrylic-based resin, an epoxy-based resin, a thiol-based resin, and an episulfide-based resin. As described above, the resin layer 12 can be provided by molding the resin 121 on the substrate 11 through use of the mold 21. Next, the resin layer 12 formed of the cured resin 121 is released from the mold 21 integrally with the substrate 11. In this manner, the diffractive optical element 10 can be manufactured.

Figure 4A:
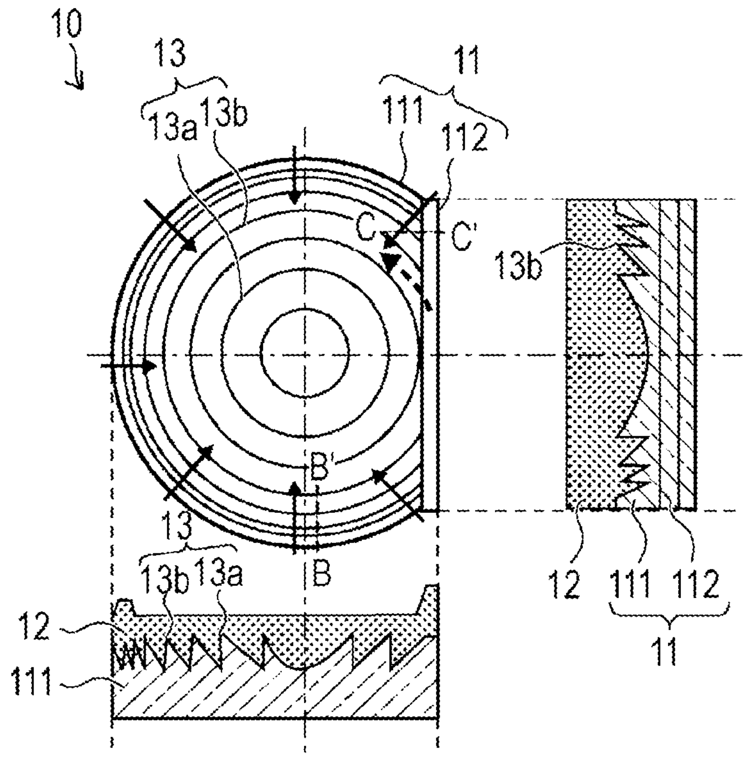
FIG. 4A, FIG. 4B, FIG. 4C, FIG. 4D, and FIG. 4E are schematic views for illustrating shrinkage of a resin at the time of curing.

FIG. 4A to FIG. 4E show shrinkage at the time of curing of the resin 121 forming the resin layer 12 in the diffractive optical element 10. FIG. 4A shows a plan view for illustrating the diffractive optical element 10 in plan view along the optical axis direction, together with a sectional view and a side view of the diffractive optical element 10.

In FIG. 4A, a view on the lower side of the plan view is a sectional view corresponding to the sectional view taken along the line A-A' of FIG. 1, and a view on the right side of the plan view is a side view obtained by viewing the diffractive optical element 10 from the chord portion 114 side. The scales of the sectional view and the side view of FIG. 4A are different from the scales of the sectional view of FIG. 1 for the sake of description. Further, the line B-B' shown in FIG. 4A is a cut line that cuts the arc portion perpendicularly to the diffraction grating 13. Further, the line C-C' shown in FIG. 4A is a cut line that cuts a boundary portion between the first portion 111 and the second portion 112 perpendicularly to the chord portion 114.

Figure 4B:
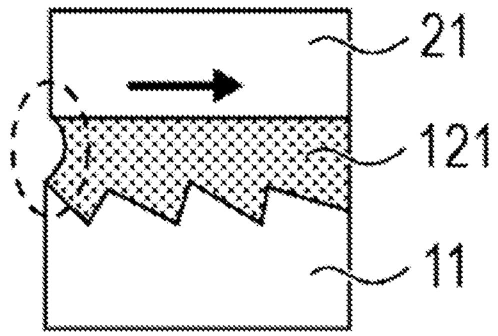
Figure 4C:
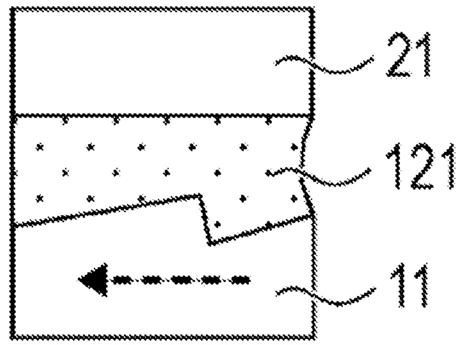
Figure 4D:
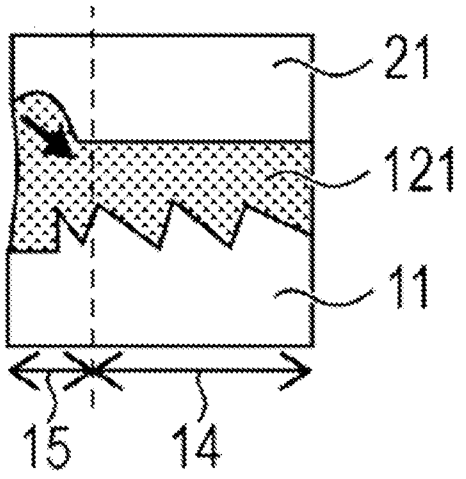
Figure 4E:
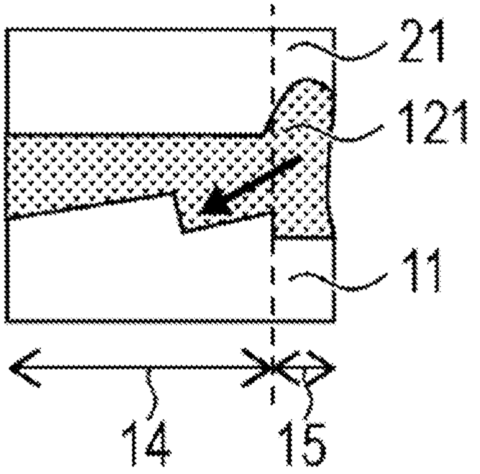

Further, FIG. 4B and FIG. 4C are each a sectional view for illustrating shrinkage of the resin 121 forming the resin layer 12 at the time of manufacturing the diffractive optical element according to Comparative Example in which the thickness of the resin layer 12 is substantially constant from the center to the outside of the optical effective diameter. FIG. 4B shows a cross section at the time of manufacture corresponding to the cross section taken along the line B-B' of FIG. 4A, and FIG. 4C shows a cross section at the time of manufacture corresponding to the cross section taken along the line C-C' of FIG. 4A. Meanwhile, FIG. 4D and FIG. 4E are each a sectional view for illustrating shrinkage of the resin 121 forming the resin layer 12 at the time of manufacturing the diffractive optical element 10 according to the first embodiment. FIG. 4D shows a cross section at the time of manufacture corresponding to the cross section taken along the line B-B' of FIG. 4A, and FIG. 4E shows a cross section at the time of manufacture corresponding to the cross section taken along the line C-C' of FIG. 4A.

In the manufacturing method described above as illustrated in FIG. 3A to FIG. 3C, the outer side of the substrate 11 is restricted at the time of curing of the resin 121 forming the resin layer 12. Accordingly, at the time of curing of the resin 121, in the diffractive optical element 10, shrinkage of the resin 121 in a radial direction occurs as indicated by the solid-line arrows of FIG. 4A mainly from the outer periphery to the inner periphery. Further, in the chord portion 114, the cross section of the diffraction grating **13*b* is exposed, and hence, in addition to the shrinkage in the radial direction, shrinkage of the resin 121 in a direction along the diffraction grating 13*b* occurs as indicated by the broken-line arrow of FIG. 4A. The broken-line arrow direction of FIG. 4A is a direction directed from the depth side to the front side of the drawing sheet of FIG. 4C. Accordingly, in the case of a comparative example in which the film thickness of the resin layer 12 is substantially constant, as illustrated in FIG. 4C, the resin 121 in the chord portion 114 and the vicinity thereof has a lower density, resulting in that a refractive index of the resin layer 12 in the chord portion 114** and the vicinity thereof changes from the design value.

In the diffractive optical element 10 according to the first embodiment, the thickness of the resin layer 12 provided in the non-optical effective region 15 outside of the optical effective diameter is larger than the thickness of the resin layer 12 provided in the optical effective region 14. Accordingly, in the first embodiment, the mold 21 for providing the resin layer 12 is a mold that allows the resin layer 12 to be provided thick in the non-optical effective region 15. Thus, as illustrated in FIG. 4D and FIG. 4E, the resin 121 can be supplied from the non-optical effective region 15 to the optical effective region 14. In this manner, in the first embodiment, the shrinkage in the radial direction of the resin 121 can be reduced, and also the shrinkage of the resin 121 in the chord portion 114 and the vicinity thereof can be reduced.

In this manner, in the first embodiment, the shrinkage of the resin 121 is reduced. Thus, occurrence of a refractive index difference due to the density difference of the resin layer 12 formed of the resin 121 can be suppressed or prevented, and thus reduction in the diffraction efficiency of the resin layer 12 can be suppressed to be small or prevented.

The shrinkage of the resin 121 in the chord portion 114 tends to be larger than the shrinkage of the resin 121 in the arc portion 113. Accordingly, it is preferred that the thickness t1 of the resin layer 12 provided in the chord portion 114 in the non-optical effective region 15 be larger than the thickness t2 of the resin layer 12 provided in the arc portion 113 in the non-optical effective region 15, that is, $t1>t2$ be satisfied.

Further, when the thickness t1 is excessively increased, there is a fear in that large curing stress may be generated in the thickness direction during a process at the time of curing of the resin 121, which may cause deformation of the diffractive optical element 10. The length from the optical center to the end portion of the substrate 11 is shorter in the chord portion 114 than in the arc portion 113. Accordingly, the substrate 11 has more advantage with respect to deformation in the chord portion 114 than in the arc portion 113, but it is preferred that the thickness t1 be kept to be no more than three times the thickness t2, that is, $t1/t2<3$ be satisfied.

Further, when a width of the resin layer 12 provided in the chord portion 114 is represented by w1, and a width of the resin layer 12 provided in the arc portion 113 is represented by w2, in consideration of also those widths together with the above-mentioned viewpoint, it is preferred that $1<(t1\times w1)/(t2\times w2)<3$ be satisfied. The width w1 and the width w2 can each be an average value.

Further, when a grating height of the diffraction grating 13 is represented by "d", it is preferred that $3<(t1-tc)/d<80$ be satisfied. The grating height "d" is a height from a boundary between the protruding portion and the base of the diffraction grating 13 to a distal end of the protruding portion of the diffraction grating 13. The grating height "d" can be an average value of the diffraction grating 13 provided on the substrate 11.

Further, when the thickness t1 is excessively increased with respect to the thickness of the resin layer 12 at the center of the diffractive optical element 10, the diffractive optical element 10 is assumed to become thick and heavy. Accordingly, it is preferred that the thickness t1 be 1,000 μm or less.

As described above, according to the first embodiment, when the diffraction grating **13*a* having the circular shape and the diffraction grating 13*b* having the arc shape are provided, the deterioration of the optical characteristic of the diffractive optical element 10 can be reduced or prevented. The optical characteristic of the diffractive optical element 10** can be evaluated by measuring, as initial evaluation, the diffraction efficiency in a desired wavelength region such as a wavelength region of, for example, from 420 nm to 700 nm. In this case, for example, when the change of the diffraction efficiency is 2% or less as compared to the design value, there is no significant influence on the optical characteristic, and hence the optical characteristic can be evaluated as being good.

Second Embodiment

A diffractive optical element according to a second embodiment of the present disclosure is described with reference to FIG. 5. Components similar to those of the first embodiment are denoted by the same reference symbols, and description thereof is omitted or simplified.

Figure 5:
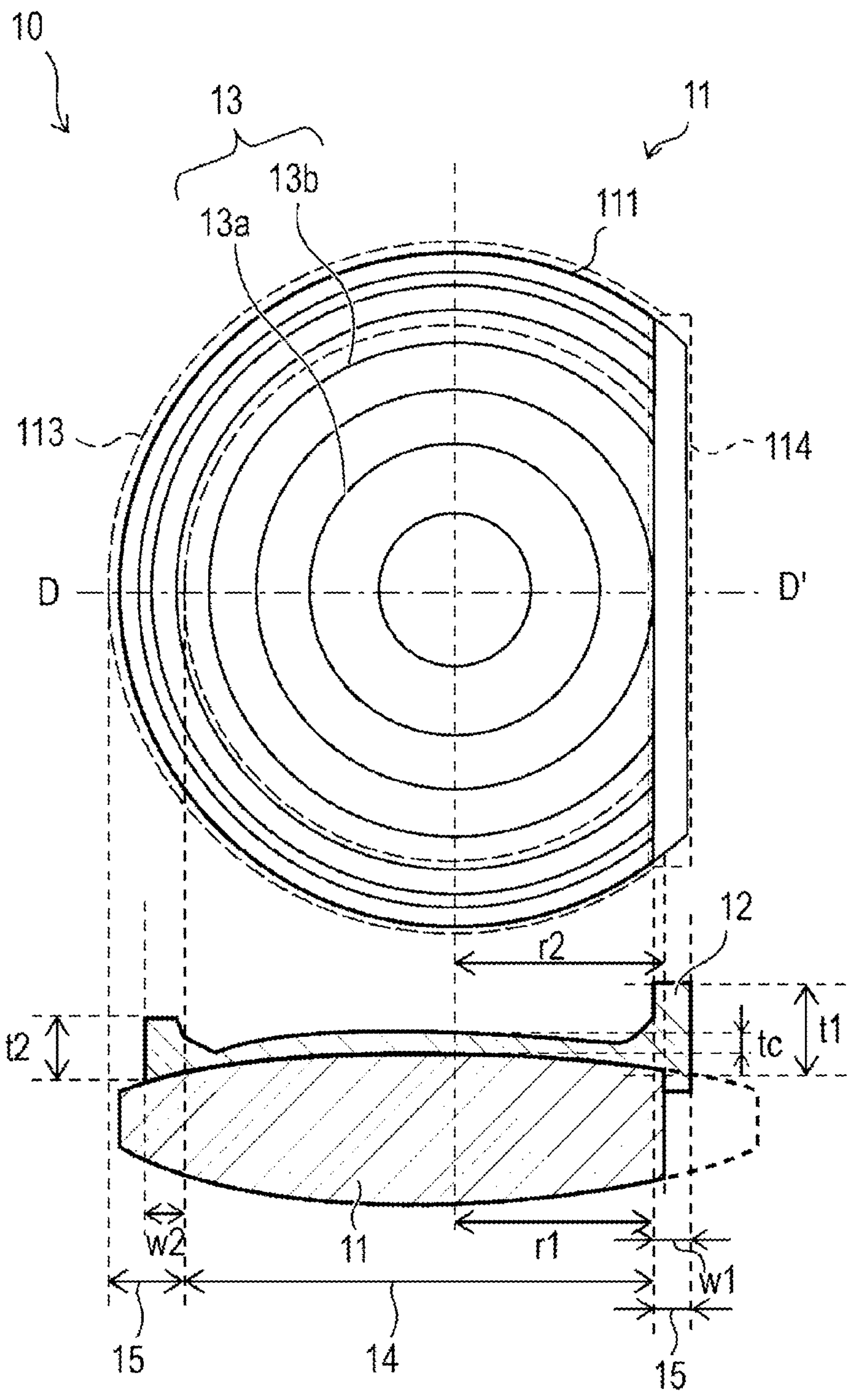
FIG. 5 is a schematic view for illustrating a diffractive optical element according to a second embodiment of the present disclosure.

FIG. 5 is a schematic view for illustrating a diffractive optical element 10 according to the second embodiment. The upper part of FIG. 5 is a plan view for illustrating the diffractive optical element 10 according to the second embodiment in plan view as viewed in an optical axis direction. The lower part of FIG. 5 is a sectional view taken along the line D-D' of the plan view in the upper part of FIG. 5.

The diffractive optical element 10 according to the second embodiment is substantially similar to the configuration of the first embodiment. The diffractive optical element 10 according to the second embodiment is different from the configuration of the first embodiment in that the substrate 11 is formed of only the first portion 111 and includes no second portion 112.

In the second embodiment, the chord portion 114 does not include the second portion 112. In this chord portion 114, the resin layer 12 is provided so as to project to the outer side of the first portion 111.

As in the second embodiment, the substrate 11 is not always required to include the first portion 111 and the second portion 112, and may be formed of only the first portion 111. In the second embodiment, a distance r2 from the optical center of the resin layer 12 to an end portion of the resin layer 12 on the chord portion 114 side is longer than a distance r1 from the optical center of the substrate 11 to the chord portion 114, and $r1<r2$ is satisfied. When the substrate 11 has no second portion 112 for supporting the resin layer 12 in the chord portion 114 as described above, a further downsized and lightweight diffractive optical element 10 can be provided.

EXAMPLES

Next, the diffractive optical element according to each of the above-mentioned embodiments and the method of manufacturing the diffractive optical element are specifically described with reference to Examples.

Example 1

A diffractive optical element according to Example 1 and a method of manufacturing the diffractive optical element are described with reference to FIG. 1 and FIG. 3A to FIG. 3C. In Example 1, the diffractive optical element 10 having the shape illustrated in FIG. 1 was manufactured.

In Example 1, first, as the substrate 11, a substrate obtained by molding a polycarbonate-based resin material (EP4500, produced by MITSUBISHI GAS CHEMICAL COMPANY, INC.) by injection molding was prepared. The substrate 11 had an outer diameter of φ46 mm, an optical effective diameter of φ42 mm, and a center thickness of 2.5 mm. One surface of the substrate 11 had a convex shape, and the other surface thereof was a flat surface. The diffraction grating 13 having a grating height of 10 μm was provided on the other surface of the substrate 11. This diffraction grating 13 was arranged concentrically with respect to an outer diameter center of the substrate 11, and its grating interval was reduced toward the outer periphery from the center. In plan view as viewed in the optical axis direction, the substrate 11 had the first portion 111 having the segmental circular shape, and the outer-peripheral diffraction grating 13*b* was cut in the chord portion 114 at a position of 16 mm from the center. On the outer side of the chord portion 114 of the first portion 111 in the substrate 11, the flat second portion 112 having a width of 2.0 mm and a thickness of 2.0 mm was provided.

Next, through the steps illustrated in FIG. 3A to FIG. 3C, the resin layer 12 was molded through use of the mold 21. As the resin 121 used at this time, an episulfide-based resin material being a photocurable resin was used. Further, the mold 21 had an outer diameter of φ48 mm, and a part corresponding to the optical effective region 14 had an aspherical surface shape corresponding to an envelope through which a vertex of the diffraction grating 13 provided on the substrate 11 passed. Further, the mold 21 had a shape in which, in the non-optical effective region 15, the thickness of the resin layer 12 was larger by 100 μm in the arc portion 113 and larger by 300 μm in the chord portion 114 than the thickness of the resin layer 12 in the optical effective region 14. With respect to such a mold 21, the resin 121 was dropped as illustrated in FIG. 3A. Next, as illustrated in FIG. 3B, the space between the mold 21 and the substrate 11 was filled with the resin 121 so that the thickness of the resin layer 12 from the envelope of the diffraction grating 13 became 100 μm. At this time, in the arc portion 113, a filling region of the resin 121 was set to a size in a range larger than the optical effective radius of 21 mm of the substrate 11 and up to a radius of 23 mm of the outer circumference of the substrate 11. An outer edge of the filling region was provided within a range of from 21.1 mm to 22.5 mm as much as possible. Further, in the chord portion 114, the filling region of the resin 121 was set to a size in a range larger than the optical effective radius of 16 mm to reach the chord portion 114 of the substrate 11 and up to a radius of 18 mm of the substrate 11. An outer edge of the filling region was provided within a range of from 16.1 mm to 17.5 mm as much as possible. After that, as illustrated in FIG. 3C, light was applied from the light irradiating machine 22 so as to cure the resin 121 and form the resin layer 12. Next, the resin layer 12 was released from the mold 21 integrally with the substrate 11 so that the diffractive optical element 10 having the shape illustrated in FIG. 1 was manufactured.

The diffractive optical element 10 according to Example 1 manufactured as described above was subjected to shape measurement after release from the mold 21. The shape measurement used a surface shape/roughness measuring machine, Form Talysurf (manufactured by Taylor Hobson). In order to measure the thickness of the resin layer 12, the surface shape of the diffractive optical element 10 on the resin layer 12 side was measured at least at three positions from the optical axis center to the end portion in the chord portion and other regions.

When the thickness t1 of the resin layer 12 outside of the optical effective diameter in the chord portion 114 was measured at three positions, the thicknesses t1 at the three positions were 450 μm, 350 μm, and 410 μm, and an average value of those values was about 400 μm. Further, when the width w1 of the resin layer 12 outside of the optical effective diameter in the chord portion 114 was measured at three positions, the widths w1 at the three positions were 1.1 mm, 0.9 mm, and 1.05 mm, and an average value of those values was about 1.0 mm. Meanwhile, when the thickness t2 of the resin layer 12 outside of the optical effective diameter in the arc portion 113 was measured at three positions, the thicknesses t2 at the three positions were 150 μm, 210 μm, and 230 μm, and an average value of those values was about 200 μm. Further, when the width w2 of the resin layer 12 outside of the optical effective diameter in the arc portion 113 was measured at three positions, the widths w2 at the three positions were 0.8 mm, 1.1 mm, and 1.2 mm, and an average value of those values was about 1.0 mm. When the thickness "tc" of the resin layer 12 in the optical effective region 14 was similarly measured, the average value of the thickness "tc" was 100 μm.

As the initial evaluation of the diffractive optical element 10 according to Example 1, the diffraction efficiency in a wavelength range of from 420 nm to 700 nm was measured. In the initial evaluation, when the change of the diffraction efficiency was 2% or less as compared to the design value, there was no significant influence on the optical performance, and hence the diffraction efficiency was evaluated as being good. As a result, as shown in Table 1, it was confirmed that the diffraction efficiency was good.

Example 2

In Example 2, the same substrate as that of Example 1 was used as the substrate 11. Further, in Example 2, the shape of the mold 21 was changed to a shape in which the thickness of the resin layer 12 in the non-optical effective region 15 became larger by 300 μm than the thickness of the resin layer 12 in the optical effective region 14 in both of the arc portion 113 and the chord portion 114. The other points were similar to those of Example 1. In this manner, the resin layer 12 was molded so that the diffractive optical element 10 was manufactured.

The diffractive optical element 10 according to Example 2 was also subjected to shape measurement after mold release, similarly to Example 1. When the thickness t1 of the resin layer 12 outside of the optical effective diameter in the chord portion 114 was measured at three positions, the thicknesses t1 at the three positions were 300 μm, 510 μm, and 400 μm, and an average value of those values was about 400 μm. Further, when the width w1 of the resin layer 12 outside of the optical effective diameter in the chord portion 114 was measured at three positions, the widths w1 at the three positions were 0.45 mm, 0.55 mm, and 0.52 mm, and an average value of those values was about 0.5 mm. Meanwhile, when the thickness t2 of the resin layer 12 outside of the optical effective diameter in the arc portion 113 was measured at three positions, the thicknesses t2 at the three positions were 420 μm, 350 μm, and 440 μm, and an average value of those values was about 400 μm. Further, when the width w2 of the resin layer 12 outside of the optical effective diameter in the arc portion 113 was measured at three positions, the widths w2 at the three positions were 0.49 mm, 0.53 mm, and 0.47 mm, and an average value of those values was about 0.5 mm. When the thickness "tc" of the resin layer 12 in the optical effective region 14 was similarly measured, the average value of the thickness "tc" was 100 μm.

As the initial evaluation of the diffractive optical element 10 according to Example 2, similarly to Example 1, the diffraction efficiency was measured and evaluated. Thus, as shown in Table 1, it was confirmed that the diffraction efficiency was good.

Example 3

In Example 3, the same substrate as that of Example 1 was used as the substrate 11. Further, in Example 3, the shape of the mold 21 was changed to a shape in which the thickness of the resin layer 12 in the non-optical effective region 15 became larger by 200 μm in the arc portion 113 and larger by 700 μm in the chord portion 114 than the thickness of the resin layer 12 in the optical effective region 14. The other points were similar to those of Example 1. In this manner, the resin layer 12 was molded so that the diffractive optical element 10 was manufactured.

The diffractive optical element 10 according to Example 3 was also subjected to shape measurement after mold release, similarly to Example 1. When the thickness t1 of the resin layer 12 outside of the optical effective diameter in the chord portion 114 was measured at three positions, the thicknesses t1 at the three positions were 610 μm, 910 μm, and 870 μm, and an average value of those values was about 800 am. Further, when the width w1 of the resin layer 12 outside of the optical effective diameter in the chord portion 114 was measured at three positions, the widths w1 at the three positions were 0.095 mm, 0.11 mm, and 0.09 mm, and an average value of those values was about 0.1 mm. Meanwhile, when the thickness t2 of the resin layer 12 outside of the optical effective diameter in the arc portion 113 was measured at three positions, the thicknesses t2 at the three positions were 370 μm, 240 μm, and 300 μm, and an average value of those values was about 300 μm. Further, when the width w2 of the resin layer 12 outside of the optical effective diameter in the arc portion 113 was measured at three positions, the widths w2 at the three positions were 0.105 mm, 0.11 mm, and 0.09 mm, and an average value of those values was about 0.1 mm. When the thickness "tc" of the resin layer 12 in the optical effective region 14 was similarly measured, the average value of the thickness "tc" was 100 μm.

As the initial evaluation of the diffractive optical element 10 according to Example 3, similarly to Example 1, the diffraction efficiency was measured and evaluated. Thus, as shown in Table 1, it was confirmed that the diffraction efficiency was good.

Example 4

A diffractive optical element according to Example 4 and a method of manufacturing the diffractive optical element are described with reference to FIG. 3A to FIG. 3C and FIG. 5. In Example 4, the diffractive optical element 10 having the shape illustrated in FIG. 5 was manufactured.

In Example 4, first, as the substrate 11, a substrate made of glass in which a diffraction grating was provided by a mold die or the like was prepared. The substrate 11 had an outer diameter of φ40 mm, an optical effective diameter of φ36 mm, and a center thickness of 5 mm. One surface of the substrate 11 had a convex shape, and the other surface thereof was a flat surface. The diffraction grating 13 having a grating height of 30 μm was provided on the other surface of the substrate 11. This diffraction grating 13 was arranged concentrically with respect to an outer diameter center of the substrate 11, and its grating interval was reduced toward the outer periphery from the center. In plan view along the optical axis direction, the substrate 11 was formed of only the first portion 111 having the segmental circular shape, and the outer-peripheral diffraction grating 13*b* and the substrate 11 were cut in the chord portion 114 at a position of 15 mm from the center.

Next, through the steps illustrated in FIG. 3A to FIG. 3C, the resin layer 12 was molded through use of the mold 21. As the resin 121 used at this time, an episulfide-based resin material being a photocurable resin was used. Further, the mold 21 had an outer diameter of φ44 mm, and a part corresponding to the optical effective region 14 had an aspherical surface shape corresponding to an envelope through which a vertex of the diffraction grating 13 provided on the substrate 11 passed. Further, the mold 21 had a shape in which, in the non-optical effective region 15, the thickness of the resin layer 12 was larger by 50 μm in the arc portion 113 and larger by 100 μm in the chord portion 114 than the thickness of the resin layer 12 in the optical effective region 14. With respect to such a mold 21, the resin 121 was dropped as illustrated in FIG. 3A. Next, as illustrated in FIG. 3B, the space between the mold 21 and the substrate 11 was filled with the resin 121 so that the thickness of the resin layer 12 from the envelope of the diffraction grating 13 became 200 μm. At this time, in the arc portion 113, a filling region of the resin 121 was set to a size in a range larger than the optical effective radius of 18 mm of the substrate 11 and up to a radius of 20 mm of the outer circumference of the substrate 11. An outer edge of the filling region was provided so as to fall within a range of from 18.1 mm to 19.8 mm as much as possible. Further, in the chord portion 114, the filling region of the resin 121 was set to a size in a range larger than the distance of 15 mm from the optical center to the chord portion 114 of the substrate 11 and up to a radius of 18 mm of the mold 21. An outer edge of the filling region was provided so as to fall within a range of from 15.1 mm to 17.5 mm as much as possible. After that, as illustrated in FIG. 3C, light was applied from the light irradiating machine 22 so as to cure the resin 121 and form the resin layer 12. Next, the resin layer 12 was released from the mold 21 integrally with the substrate 11 so that the diffractive optical element 10 having the shape illustrated in FIG. 5 was manufactured.

The diffractive optical element 10 according to Example 4 manufactured as described above was subjected to shape measurement after release from the mold 21 similarly to Example 1. When the thickness t1 of the resin layer 12 outside of the optical effective diameter in the chord portion 114 was measured at three positions, the thicknesses t1 at the three positions were 240 μm, 310 μm, and 340 μm, and an average value of those values was about 300 μm. Further, when the width w1 of the resin layer 12 outside of the optical effective diameter in the chord portion 114 was measured at three positions, the widths w1 at the three positions were 1.44 mm, 1.39 mm, and 1.36 mm, and an average value of those values was about 1.4 mm. Meanwhile, when the thickness t2 of the resin layer 12 outside of the optical effective diameter in the arc portion 113 was measured at three positions, the thicknesses t2 at the three positions were 180 μm, 270 μm, and 310 μm, and an average value of those values was about 250 μm. Further, when the width w2 of the resin layer 12 outside of the optical effective diameter in the arc portion 113 was measured at three positions, the widths w2 at the three positions were 1.55 mm, 1.65 mm, and 1.61 mm, and an average value of those values was about 1.6 mm.

When the thickness "tc" of the resin layer 12 in the optical effective region 14 was similarly measured, the average value of the thickness "tc" was 200 μm.

As the initial evaluation of the diffractive optical element 10 according to Example 4, similarly to Example 1, the diffraction efficiency was measured and evaluated. Thus, as shown in Table 1, it was confirmed that the diffraction efficiency was good.

Comparative Example 1

In Comparative Example 1, the same substrate as that of Example 1 was used as the substrate 11. Further, in Comparative Example 1, the shape of the mold 21 was changed to a shape in which the thickness of the resin layer 12 in the non-optical effective region 15 in each of the arc portion 113 and the chord portion 114 became the same as the thickness of the resin layer 12 in the optical effective region 14. The other points were similar to those of Example 1. In this manner, the resin layer 12 was molded so that the diffractive optical element 10 was manufactured.

The diffractive optical element 10 according to Comparative Example 1 was also subjected to shape measurement after mold release, similarly to Example 1. When the thickness t1 of the resin layer 12 outside of the optical effective diameter in the chord portion 114 was measured at three positions, the thicknesses t1 at the three positions were 100 μm, 80 μm, and 130 μm, and an average value of those values was about 100 μm. Further, when the width w1 of the resin layer 12 outside of the optical effective diameter in the chord portion 114 was measured at three positions, the widths w1 at the three positions were 1.05 mm, 0.85 mm, and 1.1 mm, and an average value of those values was about 1.0 mm. Meanwhile, when the thickness t2 of the resin layer 12 outside of the optical effective diameter in the arc portion 113 was measured at three positions, the thicknesses t2 at the three positions were 70 μm, 110 μm, and 120 μm, and an average value of those values was about 100 μm. Further, when the width w2 of the resin layer 12 outside of the optical effective diameter in the arc portion 113 was measured at three positions, the widths w2 at the three positions were 1.07 mm, 0.79 mm, and 1.15 mm, and an average value of those values was about 1.0 mm. When the thickness "tc" of the resin layer 12 in the optical effective region 14 was similarly measured, the average value of the thickness "tc" was 100 μm.

As the initial evaluation of the diffractive optical element 10 according to Comparative Example 1, similarly to Example 1, the diffraction efficiency was measured and evaluated. Thus, as shown in Table 1, it was confirmed that the diffraction efficiency was deteriorated.

Measurement results and evaluation results for Example 1 to Example 4 and Comparative Example 1 described above are shown in Table 1 below. Table 1 also shows calculation results of t1/t2, (t1×w1)/(t2×w2), and (t1−tc)/d, which are calculated from the grating height "d" of the diffraction grating 13, the thickness t1 and the thickness t2 of the resin layer 12, and the width w1 and the width w2 of the resin layer 12.

TABLE 1

| | Element shape | Grating height d/μm | t1/t2 | (t1 × w1)/(t2 × w2) | (t1 − tc)/d | Resin layer Center tc/μm | Thickness t1/μm | Width w1/mm | Thickness t2/μm | Width w2/mm | Diffraction efficiency evaluation |
|---|---|---|---|---|---|---|---|---|---|---|---|
| Example 1 | FIG. 1 | 10 | 2 | 2 | 30 | 100 | 400 | 1.0 | 200 | 1.0 | Good |
| Example 2 | FIG. 1 | 10 | 1 | 1 | 30 | 100 | 400 | 0.5 | 400 | 0.5 | Good |
| Example 3 | FIG. 1 | 10 | 2.7 | 2.7 | 70 | 100 | 800 | 0.1 | 300 | 0.1 | Good |
| Example 4 | FIG. 5 | 30 | 1.2 | 1.1 | 3.3 | 200 | 300 | 1.4 | 250 | 1.6 | Good |
| Comparative Example 1 | — | 10 | 1 | 1 | 0 | 100 | 100 | 1.0 | 100 | 1.0 | Deteriorated |

Third Embodiment

A diffractive optical element according to a third embodiment of the present disclosure and a method of manufacturing the diffractive optical element are described with reference to FIG. 6 to FIG. 13.

First, a configuration of the diffractive optical element according to the third embodiment is described with reference to FIG. 6 to FIG. 10.

Figure 6:
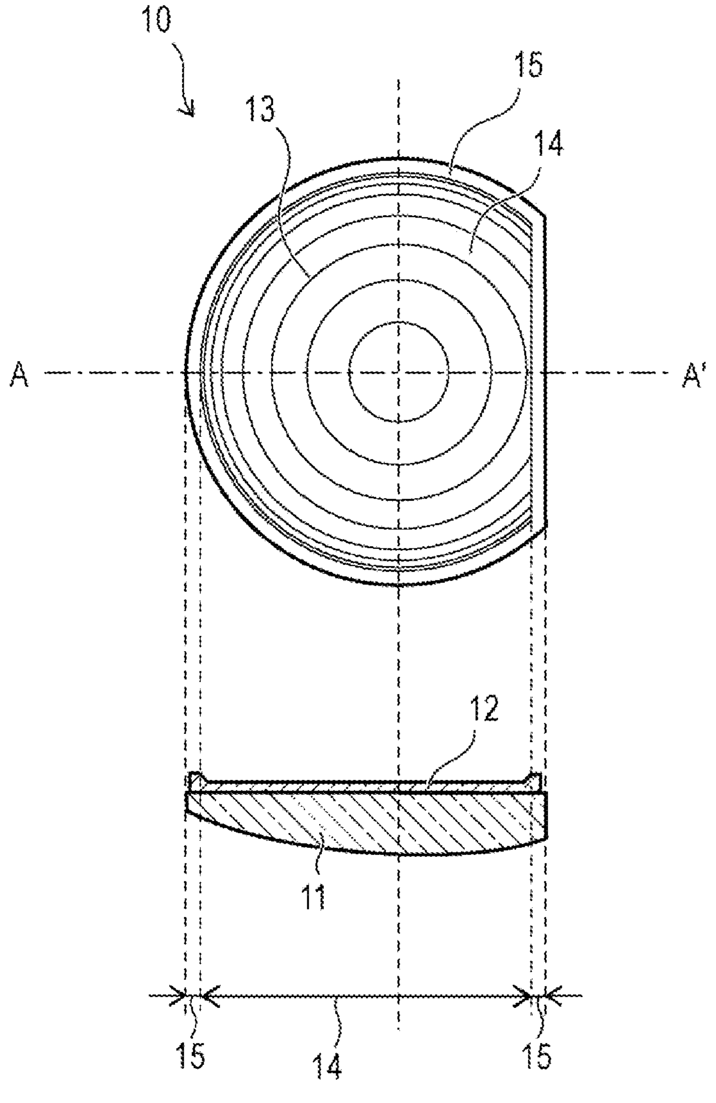
FIG. 6 is a schematic view for illustrating a diffractive optical element according to a third embodiment of the present disclosure.
Figure 7:
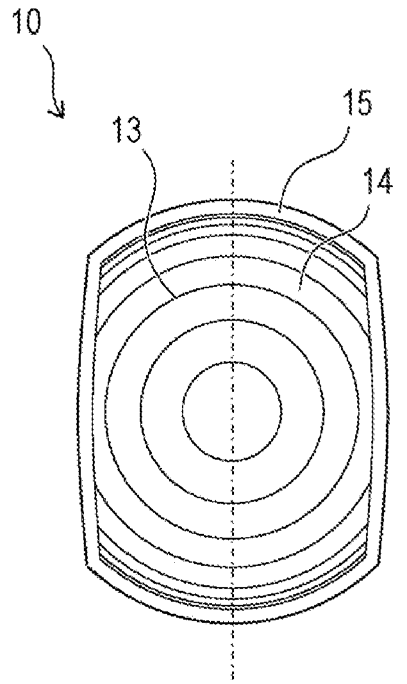
FIG. 7 is a schematic view for illustrating the diffractive optical element according to the third embodiment of the present disclosure.
Figure 8:
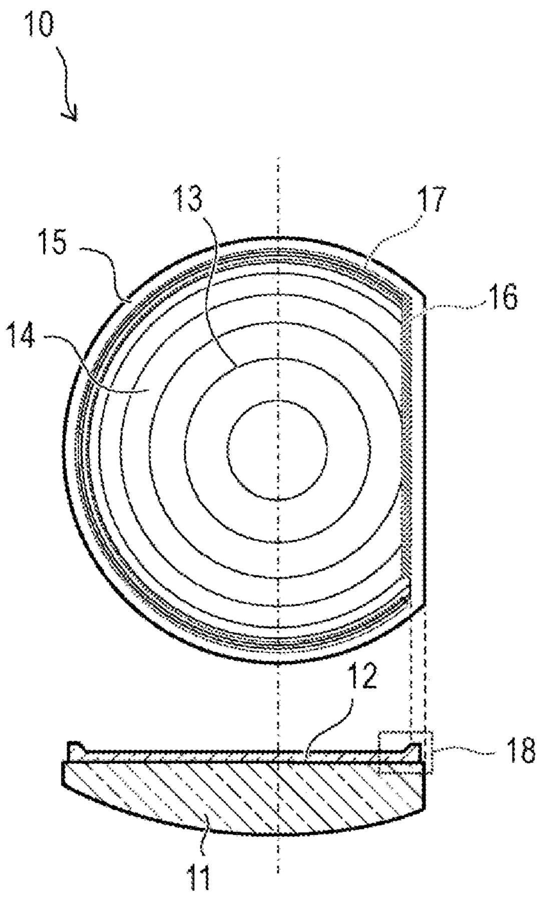
FIG. 8 is a schematic view for illustrating the diffractive optical element according to the third embodiment of the present disclosure.
Figure 9:
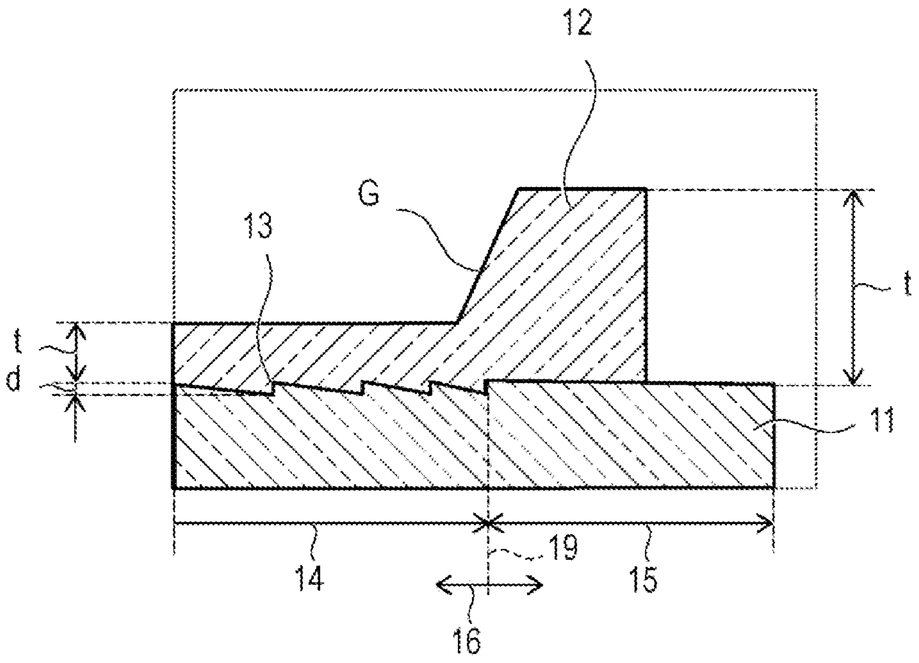
FIG. 9 is a schematic sectional view for illustrating the diffractive optical element according to the third embodiment of the present disclosure.
Figure 10:
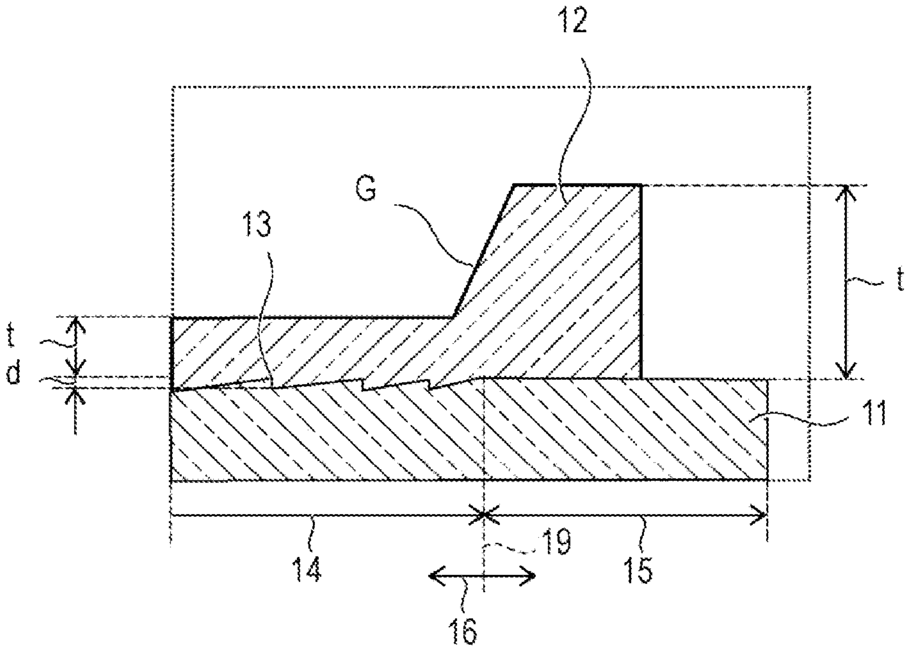
FIG. 10 is a schematic sectional view for illustrating the diffractive optical element according to the third embodiment of the present disclosure.

FIG. 6 is a schematic view for illustrating a diffractive optical element 10 according to the third embodiment. The upper part of FIG. 6 is a plan view for illustrating the diffractive optical element 10 according to the third embodiment in plan view as viewed in an optical axis direction. The lower part of FIG. 6 is a sectional view taken along the line A-A' of the plan view in the upper part of FIG. 6. FIG. 7 is a plan view for illustrating another planar shape of the diffractive optical element 10 according to the third embodiment. FIG. 8 is a schematic view for illustrating a boundary region 16 and a boundary region 17 in the diffractive optical element 10 according to the third embodiment. FIG. 9 and FIG. 10 are sectional views for illustrating examples of a sectional shape of a diffraction grating 13 in the diffractive optical element 10 according to the third embodiment, and show a region 18 surrounded by the broken lines of FIG. 8.

The diffractive optical element 10 according to the third embodiment includes, as illustrated in FIG. 6, as two optical elements, a substrate 11 serving as a body and a resin layer 12. The diffractive optical element 10 according to the third embodiment is used in an optical apparatus, such as a digital camera, a video camera, binoculars, or a head mounted display. The substrate 11 has the diffraction grating 13 provided on one surface thereof. The resin layer 12 is provided on the surface of the substrate 11 on which the diffraction grating 13 is provided so as to cover the diffraction grating 13.

The substrate 11 is, for example, a convex-lens-shaped substrate, and may be a resin substrate formed by injection molding, or a glass substrate. The shape of the substrate 11 may be a concave lens shape other than the convex lens shape, or may be a convex spherical surface shape, a concave spherical surface shape, an aspherical surface shape, a planar shape, or other shapes. Further, a material forming the substrate 11 is not particularly limited as long as the material is a transparent material having transmittance with respect to light such as visible light which is a target of the diffractive optical element 10.

The term "transparent" means that, for example, the transmittance of light having a wavelength range of from 420 nm or more to 700 nm or less is 10% or more.

In plan view as viewed in the optical axis direction of the diffractive optical element 10, the substrate 11 has a segmental circular shape which is a shape enclosed between an arc and a line connecting both ends of this arc to each other. In this case, the line connecting both ends of the arc to each other may be a straight line or a curved line. Further, the number of arcs may be one or more. That is, in the segmental circular shape, the number of segmental parts lacked from the circular shape may be one or more. The center of the circle of the segmental circular shape is the center of the circle of the diffraction grating 13, and is an optical center of the diffractive optical element 10. The shape including the planar shape of the substrate 11 is not limited to the shape illustrated in FIG. 6, and can be an appropriate shape depending on the usage of the diffractive optical element 10 or the like.

The substrate 11 has a planar shape of the segmental circular shape, and hence the diffraction grating 13 includes a diffraction grating 13 having a circular shape on the inner side of the substrate 11, and a diffraction grating 13 having an arc shape on the outer side of the substrate 11. As in the shape illustrated in FIG. 7, the planar shape of the substrate 11 may have two or more arcs. Further, the line connecting both ends of the arc to each other may be a curved line.

The diffractive optical element 10 including the substrate 11 includes a first region 14 and a second region 15. The first region 14 has a grating shape of the diffraction grating 13. The second region 15 is arranged on the outer side of the first region 14, and has no grating shape of the diffraction grating 13. The first region 14 is a region in which the diffraction grating 13 is provided, and the second region 15 is a region in which no diffraction grating is provided. The first region 14 is substantially a region through which light being a target of the diffractive optical element 10 passes. The second region 15 is a region through which the light being the target of the diffractive optical element 10 does not pass.

As illustrated in FIG. 8, the diffraction grating 13 having the arc shape is present on the outer side of the substrate 11. Accordingly, in a region including a boundary 19 between the first region 14 and the second region 15 (see FIG. 9 and FIG. 10), a boundary region 16 and a boundary region 17 are present. The boundary region 16 is present on a side on which the diffraction grating 13 is discontinuous. The boundary region 17 is present on a side on which the diffraction grating 13 is continuous. The boundary region 16 is a region including the boundary 19 between the first region 14 and the second region 15 on the side on which the diffraction grating 13 is discontinuous, that is, on a side of both ends of the diffraction grating 13 having the arc shape. The boundary region 17 is a region including the boundary 19 between the first region 14 and the second region 15 on the side on which the diffraction grating 13 is continuous, that is, on a side of a circumferential part of the diffraction grating 13 having the arc shape.

The diffraction grating 13 is formed concentrically on one surface having a planar shape of the segmental circular shape of the substrate 11, with the center of the circle of the segmental circular shape through which the optical axis of the diffractive optical element 10 passes serving as a center. In one example, the diffraction grating 13 is formed so that, as illustrated in FIG. 9, a slope surface that gently declines toward the outer periphery from the element center through which the optical axis passes and a wall surface that sharply rises are successively repeated. In another example, the diffraction grating 13 is formed so that, as illustrated in FIG. 10, a slope surface that gently ascends toward the outer periphery from the element center through which the optical axis passes and a wall surface that sharply drops are successively repeated.

The resin layer 12 is provided on one surface of the substrate 11 so as to cover the diffraction grating 13. The resin forming the resin layer 12 is not particularly limited as long as the resin is a transparent resin having transmittance with respect to light such as visible light which is the target of the diffractive optical element 10, but it is preferred that the resin be a photocurable resin or a thermosetting resin from the viewpoint of easiness in manufacture.

As illustrated at the lower part of FIG. 6, the resin layer 12 is formed on the substrate 11 in close contact with the substrate 11 so as to fill an uneven portion of the diffraction grating 13 and cover the diffraction grating 13. The resin layer 12 is formed across the first region 14 in which the diffraction grating 13 is provided and the second region 15 in which no diffraction grating 13 is provided.

A transparent inorganic film may be provided between the substrate 11 and the resin layer 12. That is, the transparent inorganic film may be provided on the diffraction grating 13 of the substrate 11, and the resin layer 12 may be provided on the substrate 11 through intermediation of the transparent inorganic film. In this case, the transparent inorganic film is a thin film made of a transparent inorganic material having transmittance with respect to light such as visible light which is the target of the diffractive optical element 10.

Examples of the inorganic material include an aluminum oxide ($Al_2O_3$), a silicon oxide ($SiO_2$, SiO), a titanium oxide ($TiO_x$), a tantalum oxide ($TaO_x$), and a niobium oxide ($NbO_x$). The transparent inorganic film can be provided along a grating surface of the diffraction grating 13 so as to cover the grating surface. The transparent inorganic film can be provided by using various film forming methods such as vacuum deposition and sputtering. With the transparent inorganic film being provided, when the substrate 11 is made of a resin, penetration or dissolution of the resin material between the substrate 11 and the resin layer 12 can be reduced or prevented, and thus the deterioration of the diffraction efficiency can be reduced or prevented.

The resin layer 12 is provided so that, as illustrated in FIG. 9 and FIG. 10, in the first region 14 which is a region through which the light being the target of the diffractive optical element 10 passes, the resin layer has substantially the same thickness "t" with respect to the envelope which is a surface passing through the edge of the diffraction grating 13. Meanwhile, the resin layer 12 is provided in the second region 15 so that the resin layer has a thickness "t" larger than the thickness in the first region 14.

Moreover, the diffractive optical element 10 according to the third embodiment at least includes a region in which a thickness increase gradient G of the resin layer 12 is 0.4 or more, in the boundary region 16 including the boundary 19 between the first region 14 and the second region 15 on the side on which the diffraction grating 13 is discontinuous. The thickness increase gradient G of the resin layer 12 as used herein refers to a gradient in which the thickness "t" of the resin layer 12 increases toward the outer side from the center of the circle of the diffraction grating 13, that is, a degree of change of the thickness "t" of the resin layer toward the outer side from the center of the circle of the diffraction grating 13. The thickness increase gradient G can be obtained as a numerical value obtained as follows. Assuming that the boundary region 16 is a region between a position on the inner side by 0.5 mm and a position on the outer side by 0.5 mm from the boundary 19 serving as a center, the boundary region 16 is divided for each 0.05 mm in width, that is, divided into twenty sections, and a change amount of the average thickness of the resin layer 12 between adjacent sections is divided by the interval of 0.05 mm.

The thickness increase gradient G includes a thickness increase gradient Ga and a thickness increase gradient Gb. The thickness increase gradient Ga is a thickness increase gradient G in the boundary region 16 including the boundary 19 on the side on which the diffraction grating 13 is discontinuous. The thickness increase gradient Gb is a thickness increase gradient G in the boundary region 17 including the boundary 19 on the side on which the diffraction grating 13 is continuous. As described above, the diffractive optical element 10 according to the third embodiment at least includes a region in which the thickness increase gradient Ga is 0.4 or more.

In the first region 14, the thickness "t" of the resin layer 12 can be regarded as an average thickness of the resin layer 12 from the envelope of the diffraction grating 13. Further, in the second region 15, the thickness "t" of the resin layer 12 can be regarded as an average thickness of the resin layer 12 provided on the substrate 11. The thickness "t" of the resin layer can be measured through use of a shape measuring machine or the like. The thickness "t" of the resin layer can be obtained by taking a difference between a measured value of the surface shape of the diffractive optical element 10 obtained by the shape measuring machine or the like and the shape of the substrate 11. As another example, the diffractive optical element 10 can be cut along a plane passing through the center of the circle of the diffraction grating, and the sectional shape can be measured to measure the thickness "t" of the resin layer.

As described above, the diffractive optical element 10 according to the third embodiment at least includes a region in which the thickness increase gradient Ga of the resin layer 12 is 0.4 or more, in the boundary region 16 including the boundary 19 on the side on which the diffraction grating 13 is discontinuous. This configuration is adopted so that, in consideration of shrinkage at the time of curing of the resin forming the resin layer 12, the density difference of the resin caused by the curing is suppressed to be small.

Figure 11A:
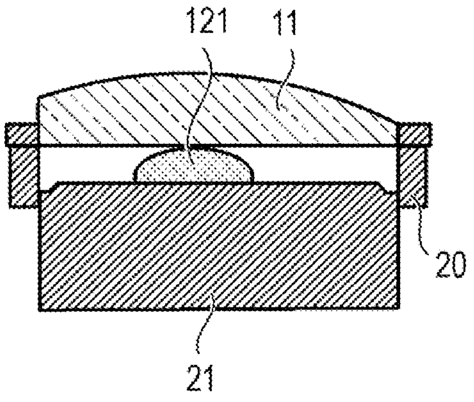
FIG. 11A, FIG. 11B, and FIG. 11C are schematic sectional views for illustrating steps of a method of manufacturing the diffractive optical element according to the third embodiment of the present disclosure.
Figure 11B:
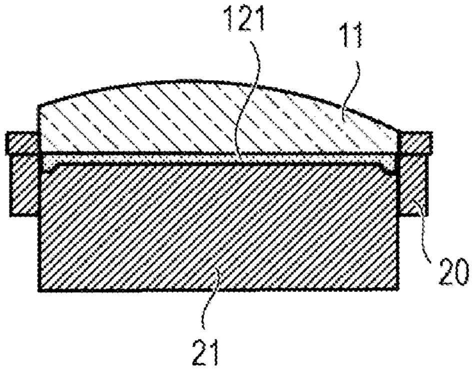
Figure 11C:
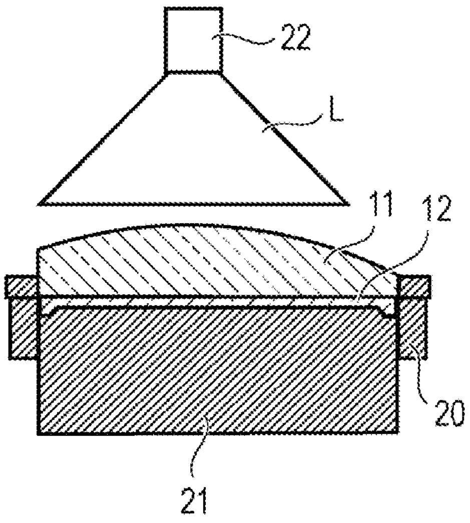
Figure 12:
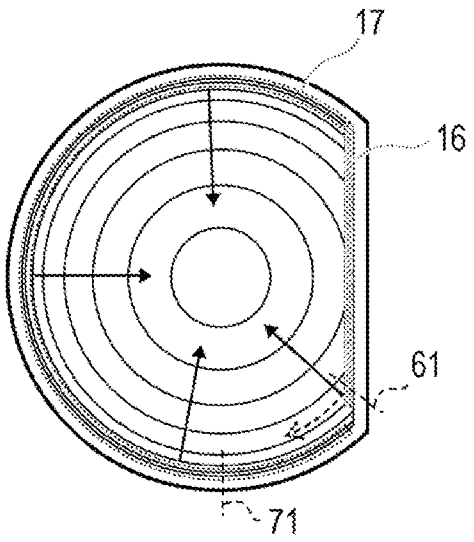
FIG. 12 is a schematic view for illustrating a curing process of the diffractive optical element according to the third embodiment of the present disclosure.
Figure 13:
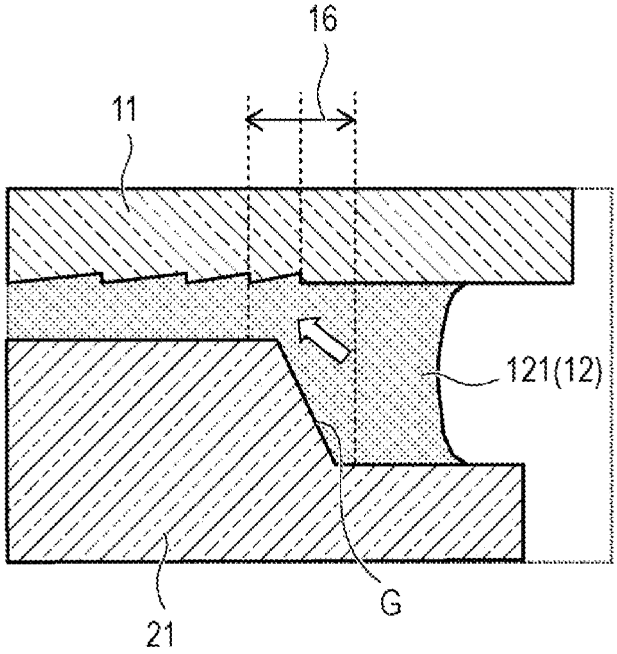
FIG. 13 is a schematic sectional view for illustrating the curing process of the diffractive optical element according to the third embodiment of the present disclosure.

The phenomenon in which the density difference of the resin is caused by curing is described with reference to FIG. 11A to FIG. 13, together with a method of manufacturing the diffractive optical element 10 according to the third embodiment. FIG. 11A to FIG. 11C are schematic sectional views for illustrating steps of the method of manufacturing the diffractive optical element 10 according to the third embodiment. FIG. 12 and FIG. 13 are a schematic view and a schematic sectional view for illustrating a curing process of the diffractive optical element 10, respectively, and are schematic views for illustrating shrinkage of the resin at the time of curing.

When the diffractive optical element 10 according to the third embodiment is manufactured, first, as illustrated in FIG. 11A, a liquid resin 121 is ejected to a mold 21 for forming the resin layer 12. Next, an ejector 20 is lowered so that the resin 121 on the mold 21 and the surface of the substrate 11 on which the diffraction grating 13 is provided are brought into contact with each other. Next, as illustrated in FIG. 11B, a space between the mold 21 and the substrate 11 is filled with the resin 121 while controlling the distance therebetween. Next, as illustrated in FIG. 11C, the resin 121 after the filling is cured so as to form the resin layer 12 formed of the cured resin 121. It is preferred that a photocurable resin or a thermosetting resin be used as the resin 121 at this time. When the photocurable resin is used as the resin 121, the resin 121 is irradiated with light L such as ultraviolet light for curing the resin 121 through the substrate 11 by a light irradiating machine 22. The photocurable resin is particularly preferred from the points of having fast curing speed and being excellent in terms of cost. Examples of the photocurable resin include an acrylic-based resin, a methacrylic-based resin, an epoxy-based resin, a thiol-based resin, and an episulfide-based resin. As described above, the resin layer 12 can be provided by molding the resin 121 on the substrate 11 through use of the mold 21. Next, the ejector 20 is raised to release the resin layer 12 formed of the cured resin 121 from the mold 21 integrally with the substrate 11. In this manner, the diffractive optical element 10 can be manufactured.

FIG. 12 and FIG. 13 each show a shrinkage behavior at the time of curing of the resin 121 forming the resin layer 12 in the diffractive optical element 10. FIG. 12 shows a plan view for illustrating the diffractive optical element 10 in plan view along the optical axis direction. FIG. 13 is a sectional view of a cross section 61 of the boundary region 16 on the side on which the diffraction grating 13 is discontinuous of FIG. 12 and a cross section 71 of the boundary region 17 on the side on which the diffraction grating 13 is continuous of FIG. 12.

In the manufacturing method described above as illustrated in FIG. 11A to FIG. 11C, the outer side of the substrate 11 is restricted at the time of curing of the resin 121 forming the resin layer 12. Accordingly, at the time of curing of the resin 121, in the diffractive optical element 10, shrinkage of the resin 121 in a radial direction occurs as indicated by the solid-line arrows of FIG. 12 mainly from the outer periphery to the inner periphery. Further, in the boundary region 16 on the side on which the diffraction grating 13 is discontinuous, the cross section of the diffraction grating 13 is exposed, and hence, in addition to the shrinkage in the radial direction, shrinkage of the resin 121 in a direction along the diffraction grating 13 occurs as indicated by the broken-line arrow of FIG. 12. Accordingly, when the thickness of the resin layer 12 is substantially constant, the resin 121 in the boundary region 16 on the side on which the diffraction grating 13 is discontinuous and the vicinity thereof has a lower density. As a result, a refractive index of the resin layer 12 in the boundary region 16 on the side on which the diffraction grating 13 is discontinuous and the vicinity thereof changes from the design value.

The diffractive optical element 10 according to the third embodiment at least includes a region in which the thickness increase gradient Ga of the resin layer 12 is 0.4 or more, in the boundary region 16 including the boundary 19 between the first region 14 and the second region 15 on the side on which the diffraction grating 13 is discontinuous. Accordingly, in the third embodiment, as illustrated in FIG. 13, the mold 21 for providing the resin layer 12 has a shape with a gradient that allows the resin layer 12 to become thick in the second region 15. Thus, the resin 121 can be supplied from the second region 15 to the first region 14 at the time of curing shrinkage of the resin 121. In this manner, in the third embodiment, the shrinkage in the radial direction of the resin 121 can be reduced, and also the shrinkage of the resin 121 in the boundary region 16 on the side on which the diffraction grating 13 is discontinuous and the vicinity thereof can be reduced. In this manner, in the third embodiment, the shrinkage of the resin 121 is reduced. Thus, occurrence of a refractive index difference due to the density difference of the resin layer 12 formed of the resin 121 can be suppressed or prevented, and thus reduction in the diffraction efficiency of the resin layer 12 can be suppressed to be small or prevented.

Further, when the thickness increase gradient Ga of the resin layer 12 is 1.8 or more, the resin 121 can be sufficiently supplied at the time of curing shrinkage, and the reduction in the diffraction efficiency can be further prevented. However, when the thickness increase gradient Ga of the resin layer 12 is larger than 12, there is a fear in that large curing shrinkage stress may be generated in the thickness direction during a process at the time of curing of the resin 121, which may cause deformation of the diffractive optical element 10. Thus, it is preferred that the thickness increase gradient Ga be 1.8 or more and 12 or less, that is, $1.8 \leq Ga \leq 12$ be satisfied. It suffices that the diffractive optical element 10 preferably include at least a region in which the thickness increase gradient Ga is 1.8 or more and 12 or less.

The shrinkage of the resin 121 in the boundary region 16 on the side on which the diffraction grating 13 is discontinuous tends to be larger than the shrinkage of the resin 121 in the boundary region 17 on the side on which the diffraction grating 13 is continuous. Accordingly, it is preferred that the thickness increase gradient Ga of the resin layer 12 in the boundary region 16 on the side on which the diffraction grating 13 is discontinuous be larger than the thickness increase gradient Gb of the resin layer 12 in the boundary region 17 on the side on which the diffraction grating 13 is continuous. That is, it is preferred that $Ga > Gb$ be satisfied. It suffices that the diffractive optical element 10 preferably include at least a region in which the thickness increase gradient Ga is larger than the thickness increase gradient Gb.

Further, it is preferred that a grating height "d" of the diffraction grating 13 be 1 μm or more and 30 μm or less in order to sufficiently obtain the effect as the diffractive optical element 10. The grating height "d" is a height from a boundary between the protruding portion and the base of the diffraction grating 13 to a distal end of the protruding portion of the diffraction grating 13. The grating height "d" can be an average value of the diffraction grating 13 provided on the substrate 11.

Further, when the thickness "t" of the resin layer 12 is smaller than 10 μm, the internal refractive index becomes uneven, and thus the diffraction efficiency is reduced. When the thickness "t" is excessively large, the diffractive optical element 10 becomes thick and heavy. Accordingly, it is preferred that the thickness "t" of the resin layer 12 be 10 μm or more and 300 μm or less. The thickness "t" of the resin layer 12 as used here can be regarded as an average thickness of the resin layer 12 formed across the first region 14 and the second region 15.

Further, it is preferred that a pitch of the diffraction grating 13 in each of the boundary regions 16 and 17 including the boundary 19 between the first region 14 and the second region 15 be 10 μm or more and 300 μm or less. In this manner, an effect as the diffractive optical element 10 can be sufficiently obtained.

As described above, according to the third embodiment, in the diffractive optical element 10 in which the diffraction grating 13a having the circular shape and the diffraction grating 13b having the arc shape are provided, the deterioration of the optical characteristic can be reduced or prevented. The optical characteristic of the diffractive optical element 10 can be evaluated by measuring, as optical performance evaluation, the diffraction efficiency in a desired wavelength range such as a wavelength range of from 420 nm to 700 nm. In this case, for example, when the change of the diffraction efficiency is 2% or less as compared to the design value, there is no significant influence on the optical characteristic, and hence the optical characteristic can be evaluated as being good.

EXAMPLES

Next, the diffractive optical element 10 according to the above-mentioned third embodiment is specifically described with reference to Examples.

Example 5

A diffractive optical element according to Example 5 and a method of manufacturing the diffractive optical element are described with reference to FIG. 6 and FIG. 11A to FIG. 11C. In Example 5, the diffractive optical element 10 having the shape illustrated in FIG. 6 was manufactured.

In Example 5, first, as the substrate 11, a substrate obtained by molding a polycarbonate-based resin material (EP4500, produced by MITSUBISHI GAS CHEMICAL COMPANY, INC.) by injection molding was prepared. The substrate 11 had an outer diameter of φ46 mm, a diameter of a region in which the diffraction grating was present of φ42 mm, a center thickness of 2.5 mm, and an outer-peripheral thickness of 1.0 mm. One surface of the substrate 11 had a convex shape, and the other surface thereof was a flat surface. The diffraction grating 13 having a grating height of 10 μm was provided on the other surface of the substrate 11. This diffraction grating 13 was arranged concentrically with respect to an outer diameter center of the substrate 11, and its grating interval was reduced toward the outer periphery from the center. In plan view as viewed in the optical axis direction, the substrate 11 had a segmental circular shape, and had a shape obtained by cutting a circle with a straight line at a position of 18 mm from the center. As the diffraction grating 13, the diffraction grating 13 having a circular shape was provided in a range from the center to a position of 16 mm, that is, with a diameter of 32 mm, and the diffraction grating 13 in a range of a diameter of from 32 mm to 42 mm had an arc shape obtained by cutting a circle with a straight line at a position of 16 mm from the center in the same direction as that of the substrate 11.

Next, through the steps illustrated in FIG. 11A to FIG. 11C, the resin layer 12 was molded through use of the mold 21. As the resin 121 used at this time, an episulfide-based resin material being a photocurable resin was used. Further, the mold 21 had an outer diameter of φ48 mm, and a part of the mold 21 corresponding to the first region 14 in which the grating shape of the diffraction grating 13 was present had an aspherical surface shape corresponding to an envelope through which a vertex of the diffraction grating 13 provided on the substrate 11 passed. Further, the mold 21 had a shape in which the resin layer 12 was to be formed so as to include a region in which the thickness increase gradient Ga of the resin layer 12 was 1.8, in the boundary region 16 including the boundary 19 between the first region 14 and the second region 15 on the side on which the diffraction grating 13 was discontinuous. With respect to such a mold 21, the resin 121 was dropped as illustrated in FIG. 11A. Next, as illustrated in FIG. 11, the ejector 20 was lowered to fill the space between the mold 21 and the substrate 11 with the resin 121 so that the thickness of the resin layer 12 from the envelope of the diffraction grating 13 became 100 μm. At this time, in the boundary region 17 on the side on which the diffraction grating 13 was continuous, a filling region of the resin 121 was set to a size in a range larger than a position of 21 mm, which corresponds to a region of the substrate 11 in which the grating shape is present, and up to a radius of 23 mm of the outer circumference of the substrate 11. In this filling region of the resin 121, an outer edge of the filling region was provided within a range of from 21.1 mm to 22.5 mm as much as possible. Further, in the boundary region 16 on the side on which the diffraction grating 13 was discontinuous, the filling region of the resin 121 was set to a size in a range between a position on the outer side of a position of 2 mm from the outer circumference, which corresponds to a region of the substrate 11 in which the grating shape is present, and the outer circumference of the substrate 11. In this filling region of the resin 121, an outer edge of the filling region was provided within a range of from 1.9 mm to 0.5 mm from the outer circumference as much as possible. After that, as illustrated in FIG. 11C, ultraviolet light was applied from the light irradiating machine 22 so as to cure the resin 121 and form the resin layer 12. Next, the ejector 20 was raised to release the resin layer 12 from the mold 21 integrally with the substrate 11 so that the diffractive optical element 10 having the shape illustrated in FIG. 6 was manufactured.

The diffractive optical element 10 according to Example 5 manufactured as described above was subjected to shape measurement after release from the mold 21. The shape measurement used a surface shape measuring machine, Form Talysurf (manufactured by Taylor Hobson). In order to measure the thickness of the resin layer 12, the surface shape of the diffractive optical element 10 on the resin layer 12 side was measured at least at three positions from the optical axis center to the end portion, in each of a direction of the boundary region 16 on the side on which the diffraction grating 13 is discontinuous and a direction of the boundary region 17 on the side on which the diffraction grating 13 is continuous.

When the thickness increase gradient Ga of the resin layer 12 in the boundary region 16 on the side on which the diffraction grating 13 is discontinuous, which included the boundary 19 between the first region 14 and the second region 15, was measured at three positions, the three positions each included a portion having the maximum Ga of 1.8. Specifically, the average thickness of the resin layer 12 from a position of 15.5 mm to a position of 16.5 mm from the center of the diffraction grating 13 for each 0.05 mm was as follows. That is, the average thickness of the resin layer 12 was 100 μm (15.5 mm to 15.9 mm), 190 μm (15.95 mm), 280 μm (16 mm), and 370 μm (16.05 mm to 16.5 mm). The thickness increase gradient Ga of the resin layer 12 was calculated as 0.0 (15.5 mm to 15.9 mm), 1.8 (15.95 mm to 16.05 mm), and 0.0 (16.1 mm to 16.5 mm). The boundary 19 between the first region 14 and the second region 15 was present at a position of 16 mm from the center of the diffraction grating 13.

Further, when the thickness increase gradient Gb of the resin layer in the boundary region 17 on the side on which the diffraction grating 13 is continuous, which included the boundary 19 between the first region 14 and the second region 15, was measured at three positions, the three positions each included a portion having the maximum Gb of 0.8. Specifically, the average thickness of the resin layer 12 from a position of 20.5 mm to a position of 21.5 mm from the center of the diffraction grating 13 for each 0.05 mm was as follows. That is, the average thickness of the resin layer 12 was 100 μm (20.5 mm to 20.9 mm), 140 μm (20.95 mm), 180 μm (21 mm), and 220 μm (21.05 mm to 21.5 mm). The thickness increase gradient Gb of the resin layer 12 was calculated as 0.0 (20.5 mm to 20.9 mm), 0.8 (20.95 mm to 21.05 mm), and 0.0 (21.1 mm to 21.5 mm). The boundary 19 between the first region 14 and the second region 15 in which the diffraction grating was not present was present at a position of 21 mm from the center of the diffraction grating 13.

As the optical performance evaluation of the diffractive optical element 10 according to Example 5, a diffraction efficiency in a wavelength range of from 420 nm to 700 nm was measured. In the optical performance evaluation, when the change of the diffraction efficiency was 1% or less as compared to the design value, there was no significant influence on the optical performance, and hence the optical performance was evaluated as “a” representing very good. When the change of the diffraction efficiency was more than 1% and 2% or less as compared to the design value, there was no significant problem on the optical performance, and hence the optical performance was evaluated as “b” representing good. When the change of the diffraction efficiency was more than 2% as compared to the design value, the deterioration of the optical performance was unignorable, and hence the optical performance was evaluated as “c” representing bad. Further, as the shape accuracy evaluation of the diffractive optical element 10, the shape of the surface of the resin layer 12 was compared to the design shape. When the difference from the design shape was 1 μm or less, there was no significant influence on the optical performance, and hence the shape accuracy was evaluated as “a” representing very good. When the difference from the design shape was more than 1 μm and 2 μm or less, there was no significant problem on the optical performance, and hence the shape accuracy was evaluated as “b” representing good. When the difference from the design shape was more than 2 μm, the deterioration of the optical performance was unignorable, and hence the shape accuracy was evaluated as “c” representing bad. As a result, for the diffractive optical element 10 according to Example 5, as shown in Table 2, it was confirmed that both of the optical performance and the shape accuracy were very good.

Example 6

In Example 6, the same substrate as that of Example 5 was used as the substrate 11. Further, the shape of the mold 21 was a shape in which the resin layer 12 was to be formed to have a region in which the thickness increase gradient Ga of the resin layer 12 in the boundary region 16 on the side on which the diffraction grating 13 was discontinuous was 0.4. Further, the shape of the mold 21 was a shape in which the resin layer 12 was to be formed to have a region in which the thickness increase gradient Gb of the resin layer 12 in the boundary region 17 on the side on which the diffraction grating 13 was continuous was 0.2. The other points were similar to those of Example 5. In this manner, the resin layer 12 was molded so that the diffractive optical element 10 was manufactured.

The diffractive optical element 10 according to Example 6 was also subjected to shape measurement after mold release similarly to Example 5. The three positions each included a portion having the maximum thickness increase gradient Ga of 0.4. Further, the three positions each included a portion having the maximum thickness increase gradient Gb of 0.2.

For the diffractive optical element 10 according to Example 6, the optical performance and the shape accuracy were measured and evaluated similarly to Example 5. As a result, as shown in Table 2, it was confirmed that the optical performance was good and the shape accuracy was very good.

Example 7

In Example 7, the same substrate as that of Example 5 was used as the substrate 11. Further, the shape of the mold 21 was a shape in which the resin layer 12 was to be formed to have a region in which the thickness increase gradient Ga of the resin layer 12 in the boundary region 16 on the side on which the diffraction grating 13 was discontinuous was 1.8. Further, the shape of the mold 21 was a shape in which the resin layer 12 was to be formed to have a region in which the thickness increase gradient Gb of the resin layer 12 in the boundary region 17 on the side on which the diffraction grating 13 was continuous was 1.8. The other points were similar to those of Example 5. In this manner, the resin layer 12 was molded so that the diffractive optical element 10 was manufactured.

The diffractive optical element 10 according to Example 7 was also subjected to shape measurement after mold release similarly to Example 5. The three positions each included a portion having the maximum thickness increase gradient Ga of 1.8. The three positions each included a portion having the maximum thickness increase gradient Gb of 1.8.

For the diffractive optical element 10 according to Example 7, the optical performance and the shape accuracy were measured and evaluated similarly to Example 5. As a result, as shown in Table 2, it was confirmed that the optical performance was very good and the shape accuracy was good.

Example 8

In Example 8, the same substrate as that of Example 5 was used as the substrate 11. Further, the shape of the mold 21 was a shape in which the resin layer 12 was to be formed to have a region in which the thickness increase gradient Ga of the resin layer 12 in the boundary region 16 on the side on which the diffraction grating 13 was discontinuous was 0.4. Further, the shape of the mold 21 was a shape in which the resin layer 12 was to be formed to have a region in which the thickness increase gradient Gb of the resin layer 12 in the boundary region 17 on the side on which the diffraction grating 13 was continuous was 0.8. The other points were similar to those of Example 5. In this manner, the resin layer 12 was molded so that the diffractive optical element 10 was manufactured.

The diffractive optical element 10 according to Example 8 was also subjected to shape measurement after mold release similarly to Example 5. The three positions each included a portion having the maximum thickness increase gradient Ga of 0.4. The three positions each included a portion having the maximum thickness increase gradient Gb of 0.8.

For the diffractive optical element 10 according to Example 8, the optical performance and the shape accuracy were measured and evaluated similarly to Example 5. As a result, as shown in Table 2, it was confirmed that both of the optical performance and the shape accuracy were good.

Example 9

In Example 9, the diffractive optical element 10 having the shape illustrated in FIG. 7 was manufactured as the substrate 11. The substrate 11 had an outer diameter of φ46 mm, a diameter of a region in which the diffraction grating 13 was present of φ42 mm, a center thickness of 2.5 mm, and an outer-peripheral thickness of 1.0 mm. One surface of the substrate 11 had a convex shape, and the other surface thereof was a flat surface. The diffraction grating 13 having a grating height of 10 μm was provided on the other surface of the substrate 11. In plan view as viewed in the optical axis direction, the substrate 11 had a segmental circular shape in which two portions were lacked in symmetry with respect to the optical axis, and had a shape obtained by cutting a circle with curved lines at positions of substantially 18 mm from the center. As the diffraction grating 13, the diffraction grating 13 having a circular shape was provided in a range from the center to a position of 16 mm, that is, with a diameter of 32 mm, and the diffraction grating 13 in a range of a diameter of from 32 mm to 42 mm had an arc shape obtained by cutting a circle with curved lines at positions of substantially 16 mm from the center in the same direction as that of the substrate 11. Further, the shape of the mold 21 was a shape in which the resin layer 12 was to be formed to have a region in which the thickness increase gradient Ga of the resin layer 12 in the boundary region 16 on the side on which the diffraction grating 13 was discontinuous was 1.8. Further, the shape of the mold 21 was a shape in which the resin layer 12 was to be formed to have a region in which the thickness increase gradient Gb of the resin layer 12 in the boundary region 17 on the side on which the diffraction grating 13 was continuous was 0.8. The other points were similar to those of Example 5. In this manner, the resin layer 12 was molded so that the diffractive optical element 10 was manufactured.

The diffractive optical element 10 according to Example 9 was also subjected to shape measurement after mold release similarly to Example 5. The three positions each included a portion having the maximum thickness increase gradient Ga of 1.8. The three positions each included a portion having the maximum thickness increase gradient Gb of 0.8.

For the diffractive optical element 10 according to Example 9, the optical performance and the shape accuracy were measured and evaluated similarly to Example 5. As a result, as shown in Table 2, it was confirmed that both of the optical performance and the shape accuracy were very good.

Example 10

In Example 10, the resin layer 12 was molded so that the thickness of the resin layer 12 from the envelope of the diffraction grating 13 became 12 μm. The other points were similar to those of Example 5. In this manner, the resin layer 12 was molded so that the diffractive optical element 10 was manufactured.

The diffractive optical element 10 according to Example 10 was also subjected to shape measurement after mold release similarly to Example 5. The three positions each included a portion having the maximum thickness increase gradient Ga of 1.8. The three positions each included a portion having the maximum thickness increase gradient Gb of 0.8.

For the diffractive optical element 10 according to Example 10, the optical performance and the shape accuracy were measured and evaluated similarly to Example 5. As a result, as shown in Table 2, it was confirmed that both of the optical performance and the shape accuracy were very good.

Comparative Example 2

In Comparative Example 2, the same substrate as that of Example 5 was used as the substrate 11. Further, the shape of the mold 21 was a shape in which the resin layer 12 was to be formed so that the thickness increase gradient Ga of the resin layer 12 in the boundary region 16 on the side on which the diffraction grating 13 was discontinuous became 0, that is, the resin layer 12 became flat. Further, the shape of the mold 21 was a shape in which the resin layer 12 was to be formed so that the thickness increase gradient Gb of the resin layer 12 in the boundary region 17 on the side on which the diffraction grating 13 was continuous became 0, that is, the resin layer 12 became flat. The other points were similar to those of Example 5. In this manner, the resin layer 12 was molded so that the diffractive optical element 10 was manufactured.

The diffractive optical element 10 according to Comparative Example 2 was also subjected to shape measurement after mold release similarly to Example 5. The three positions each included a portion having the maximum thickness increase gradient Ga of 0.0. The three positions each included a portion having the maximum thickness increase gradient Gb of 0.0.

For the diffractive optical element 10 according to Comparative Example 2, the optical performance and the shape accuracy were measured and evaluated similarly to Example 5. As a result, as shown in Table 2, it was confirmed that both of the optical performance and the shape accuracy were bad.

Evaluation results for Example 5 to Example 10 and Comparative Example 2 described above are shown in Table 2 below.

TABLE 2

| | Element shape | | | | Evaluation | | | |
|---|---|---|---|---|---|---|---|---|
| | Outer shape | Average thickness of resin layer | Thickness increase gradient of resin layer Ga | Thickness increase gradient of resin layer Gb | Optical performance evaluation (diffraction efficiency reduction) | | Shape accuracy evaluation (deviation from design value) | |
| Example 5 | One-side cut | 100 μm | 1.8 | 0.8 | a | 0.6% | a | 0.4 μm |
| Example 6 | One-side cut | 100 μm | 0.4 | 0.2 | b | 1.5% | a | 0.3 μm |
| Example 7 | One-side cut | 100 μm | 1.8 | 1.8 | a | 0.6% | b | 1.4 μm |
| Example 8 | One-side cut | 100 μm | 0.4 | 0.8 | b | 1.6% | b | 1.1 μm |
| Example 9 | Two-side cut | 100 μm | 1.8 | 0.8 | a | 0.7% | a | 0.4 μm |
| Example 10 | One-side cut | 12 μm | 1.8 | 0.8 | a | 0.6% | a | 0.3 μm |
| Comparative Example 2 | One-side cut | 100 μm | 0 | 0 | c | 3.1% | a | 0.4 μm |

Fourth Embodiment

The diffractive optical element 10 according to each of the first embodiment to the third embodiment described above can be applied to various apparatus and devices such as an optical apparatus, a display apparatus, and an imaging apparatus. In a fourth embodiment of the present disclosure, an optical apparatus, a display apparatus, and an imaging apparatus are described as specific application examples of the diffractive optical element 10 according to each of the first embodiment and the second embodiment.

(Optical Apparatus)

The specific application examples of the diffractive optical element 10 according to each of the first embodiment to the third embodiment include: a lens for forming an optical apparatus (image taking optical system) for a camera or a video camera; and a lens for forming an optical apparatus (projecting optical system) for a liquid crystal projector. In addition, the diffractive optical element may be used in a pickup lens of a DVD recorder or the like. Those optical systems each include at least one lens arranged in a housing, and the diffractive optical element 10 according to the first embodiment can be used as at least one of the lenses.

(Display Apparatus)

Figure 14A:
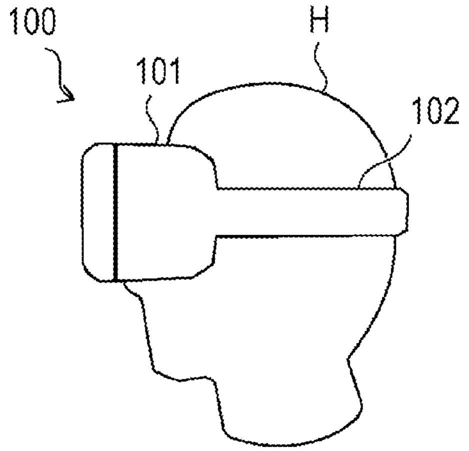
FIG. 14A, FIG. 14B, and FIG. 14C are schematic views for illustrating a display apparatus according to a fourth embodiment of the present disclosure.
Figure 14B:
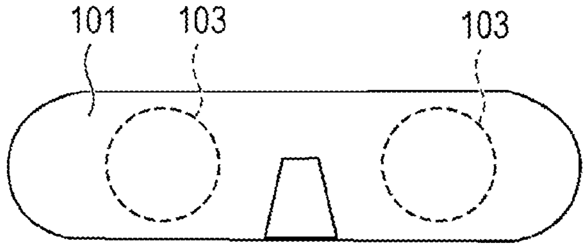
Figure 14C:
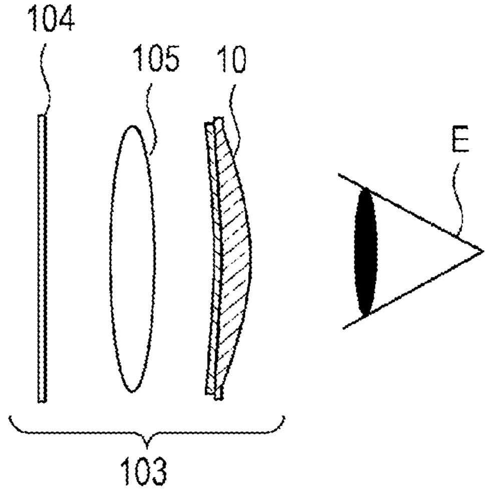

FIG. 14A to FIG. 14C are schematic views for illustrating a configuration of a head mounted display (HMD) 100, which is an example of a preferred embodiment of a display apparatus using the diffractive optical element 10 according to each of the first embodiment and the second embodiment. FIG. 14A is a side view for illustrating the HMD 100. FIG. 14B is a front view for illustrating the HMD 100. FIG. 14C is a schematic view for illustrating an optical system of the HMD 100.

As illustrated in FIG. 14A and FIG. 14B, the HMD 100 includes a housing 101, a mounting fixture 102, and display units 103 for a left eye and a right eye. Each display unit 103 is provided in the housing 101. The HMD 100 is mounted on a head H of a user by the mounting fixture 102 so that the display units 103 for the left eye and the right eye are positioned so as to correspond to the respective left and right eyes of the user.

As illustrated in FIG. 14C, each display unit 103 includes a display panel 104, an optical system 105, and the diffractive optical element 10 according to the first or second embodiment. The display panel 104 is a display unit such as an organic electroluminescence (EL) panel or a liquid crystal panel, and displays an image for the corresponding left eye or right eye. The optical system 105 images image light emitted from the display panel 104 onto a position of an eye E of the user. The optical system 105 may include, depending on the design of the HMD 100, a transmitting optical element such as a convex lens or a concave lens, a reflecting optical element such as a concave mirror, an optical path changing element such as a mirror or a polarization beam splitter (PBS), or the like. The diffractive optical element 10 is mounted so as to be positioned between the optical system 105 and the eye E, and corrects the chromatic aberration of the image light exiting from the optical system 105 to be imaged onto the eye E via the diffractive optical element 10. The diffractive optical element 10 forms, together with the optical system 105, an optical system for guiding the image light that is light emitted from the display panel 104 to the eye E of the user, and functions as at least one lens in this optical system.

Herein, the display apparatus has been described by using the HMD. However, the diffractive optical element 10 may be similarly used in a projector or the like.

(Imaging Apparatus)

Figure 15:
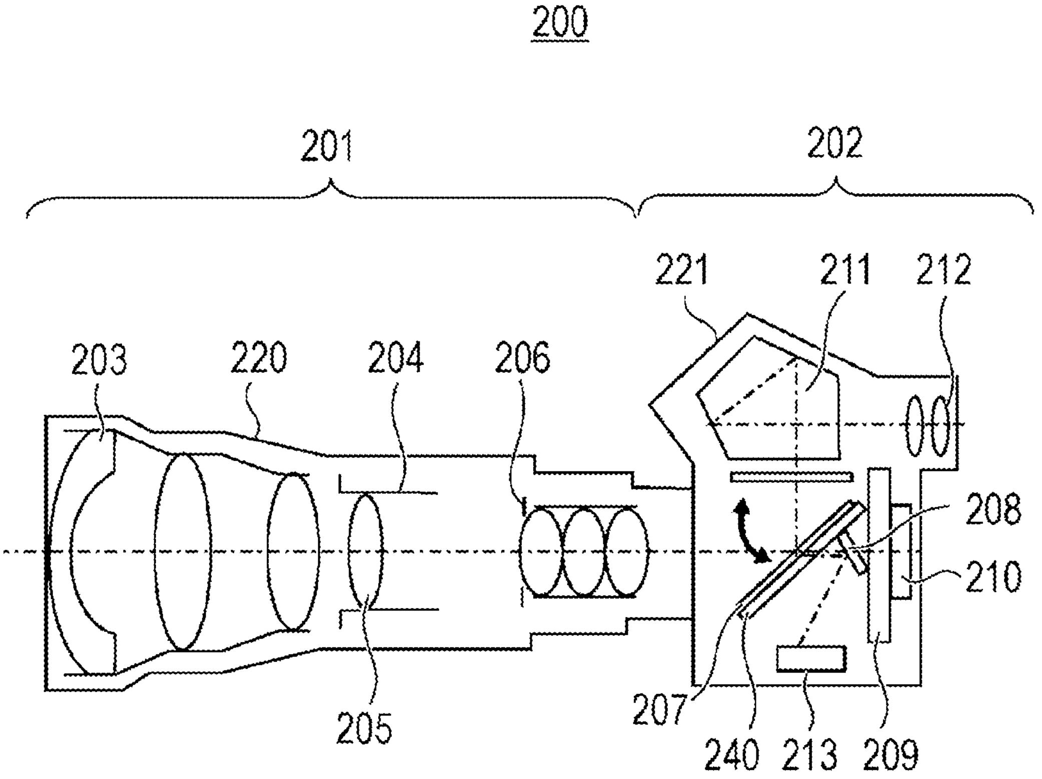
FIG. 15 is a schematic view for illustrating an imaging apparatus according to the fourth embodiment of the present disclosure.

FIG. 15 is an illustration of an example of the imaging apparatus according to an exemplary embodiment using the diffractive optical element 10 according to the first embodiment, and is a schematic view for illustrating the configuration of a single-lens reflex digital camera 200. In FIG. 15, a camera main body 202 and a lens barrel 201 that is an optical apparatus are connected to each other, and the lens barrel 201 is a so-called interchangeable lens removably mounted onto the camera main body 202.

An image of light from an object is taken through an optical system formed of, for example, a plurality of lenses 203 and 205 arranged on the optical axis of an image taking optical system in a housing 220 of the lens barrel 201. The diffractive optical element 10 according to the first embodiment may be used in, for example, each of the lenses 203 and 205. Herein, the lens 205 is supported by an inner barrel 204, and is movably supported with respect to an outer barrel of the lens barrel 201 for focusing and zooming.

In an observation period before the image taking, the light from the object is reflected by a main mirror 207 in a housing 221 of the camera main body to be transmitted through a prism 211. After that, the taken image is projected to a photographer through a finder lens 212. The main mirror 207 is, for example, a half mirror, and the light that has been transmitted through the main mirror 207 is reflected toward an autofocus (AF) unit 213 by a submirror 208. The reflected light is used in, for example, distance measurement. In addition, the main mirror 207 is mounted on and supported by a main mirror holder 240 through bonding or the like. At the time of the image taking, the main mirror 207 and the submirror 208 are moved to the outside of an optical path via a driving mechanism (not shown) to open a shutter 209 so that an imaging element 210 may receive the light that has entered from the lens barrel 201 and has passed through the image taking optical system to form a taken light image. In addition, a diaphragm 206 is configured to be capable of changing brightness and a focal depth at the time of the image taking by changing its opening area.

Herein, the imaging apparatus has been described by using the single-lens reflex digital camera. However, the diffractive optical element 10 may be similarly used in, for example, a smartphone, a compact digital camera, or a drone.

According to the present disclosure, when, in plan view, a diffraction grating having a circular shape and a diffraction grating having an arc shape are provided, deterioration of the optical characteristic can be reduced or prevented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-046875, filed Mar. 23, 2023, and Japanese Patent Application No. 2023-142311, filed Sep. 1, 2023, which are hereby incorporated by reference herein in their entirety.

What is claimed is:

1. A diffractive optical element comprising:

a substrate having a surface on which a diffraction grating is provided; and a resin layer provided on the surface of the substrate so as to cover the diffraction grating, wherein, in plan view as viewed along an optical axis direction, the diffraction grating includes:

a first diffraction grating having a circular shape; and a second diffraction grating having an arc shape, the second diffraction grating being arranged on an outer side of the first diffraction grating, wherein the diffractive optical element includes an optical effective region and a non-optical effective region surrounding the optical effective region, wherein the second diffraction grating has an arc end positioned in the non-optical effective region, and wherein a thickness of the resin layer provided in the non-optical effective region is larger than a thickness of the resin layer provided in the optical effective region, wherein the substrate includes, in the plan view, a first portion having a planar shape of a segmental circular shape enclosed between an arc and a chord connecting both ends of the arc to each other, and wherein the non-optical effective region includes:

an arc portion which is an end portion of the first portion on the arc side; and a chord portion including an end portion of the first portion on the chord side.

2. The diffractive optical element according to claim 1, wherein $t1>t2$ is satisfied, where t1 represents a thickness of the resin layer provided in the chord portion, and t2 represents a thickness of the resin layer provided in the arc portion.

3. The diffractive optical element according to claim 2, wherein $t1/t2<3$ is satisfied.

4. The diffractive optical element according to claim 2, wherein $1<(t1\times w1)/(t2\times w2)<3$ is satisfied, where w1 represents a width of the resin layer provided in the chord portion, and w2 represents a width of the resin layer provided in the arc portion.

5. The diffractive optical element according to claim 2, wherein $3<(t1-tc)/d<80$ is satisfied, where "tc" represents a thickness of the resin layer provided in the optical effective region, and "d" represents a height of the diffraction grating.

6. The diffractive optical element according to claim 1, wherein the substrate includes a second portion provided on the chord side of the first portion, wherein the second portion has, in the plan view, a planar shape of a rectangular shape, and wherein the chord portion includes the second portion.

7. The diffractive optical element according to claim 1, wherein $r1<r2$ is satisfied, where r1 represents a distance from an optical center of the substrate to the chord portion, and r2 represents a distance from the optical center of the resin layer to an end portion of the resin layer on the chord portion side.

8. The diffractive optical element according to claim 1, wherein the resin layer is made of a photocurable resin.

9. The diffractive optical element according to claim 8, wherein the photocurable resin is an episulfide-based resin.

10. The diffractive optical element according to claim 1, further comprising an inorganic film provided between the substrate and the resin layer.

11. The diffractive optical element according to claim 1, wherein the substrate is a resin substrate or a glass substrate.

12. The diffractive optical element according to claim 1, wherein the diffractive optical element includes a first region in which the diffraction grating is provided and a second region in which the diffraction grating is not provided, the second region being arranged on an outer side of the first region, and wherein the diffractive optical element includes a region in which a first gradient in which a thickness of the resin layer increases toward an outer side from a center of a circle of the diffraction grating is 0.4 or more, in a third region including a boundary between the first region and the second region on a side on which the diffraction grating is discontinuous.

13. The diffractive optical element according to claim 12, wherein the diffractive optical element at least includes a region in which the first gradient is 1.8 or more and 12 or less.

14. The diffractive optical element according to claim 12, wherein the diffractive optical element includes a region in which the first gradient is larger than a second gradient in which the thickness of the resin layer increases toward the outer side from the center of the circle of the diffraction grating in a fourth region including the boundary on a side on which the diffraction grating is continuous.

15. An optical apparatus comprising:

a housing; and an optical system arranged in the housing, the optical system including at least one lens, wherein at least one of the at least one lens is the diffractive optical element of claim 1.

16. A display apparatus comprising:

a housing;

an optical system arranged in the housing, the optical system including at least one lens; and a display unit configured to emit light to be guided by the optical system, wherein at least one of the at least one lens is the diffractive optical element of claim 1.

17. An imaging apparatus comprising:

a housing;

an optical system arranged in the housing, the optical system including at least one lens; and an imaging element configured to receive light that has passed through the optical system, wherein at least one of the at least one lens is the diffractive optical element of claim 1.

* * * * *